US009098962B2

(12) United States Patent
Obara et al.

(10) Patent No.: US 9,098,962 B2
(45) Date of Patent: Aug. 4, 2015

(54) AUTOMATIC TRANSACTION APPARATUS AND AUTOMATIC TRANSACTION SYSTEM

(75) Inventors: Tomomichi Obara, Maebashi (JP); Satoshi Tomi, Inagi (JP)

(73) Assignees: FUJITSU LIMITED, Kawasaki (JP); FUJITSU FRONTECH LIMITED, Tokyo (JP)

( * ) Notice: Subject to any disclaimer, the term of this patent is extended or adjusted under 35 U.S.C. 154(b) by 1040 days.

(21) Appl. No.: 10/830,098

(22) Filed: Apr. 23, 2004

(65) Prior Publication Data

US 2005/0114263 A1 May 26, 2005

(30) Foreign Application Priority Data

Nov. 20, 2003 (JP) ................................. 2003-390478

(51) Int. Cl.
*G06F 9/44* (2006.01)
*G07F 19/00* (2006.01)
*G06Q 20/10* (2012.01)

(52) U.S. Cl.
CPC .............. *G07F 19/206* (2013.01); *G06Q 20/10* (2013.01); *G06Q 20/1085* (2013.01); *G07F 19/20* (2013.01); *G07F 19/211* (2013.01)

(58) Field of Classification Search
USPC ......... 705/27, 35, 43; 235/375–381; 709/219, 709/249, 201, 232; 717/115, 143, 139; 710/20; 707/102
IPC ................ G06F 17/30861; G07F 19/20,19/201, G07F 19/211, 19/206
See application file for complete search history.

(56) References Cited

U.S. PATENT DOCUMENTS

| | | | | |
|---|---|---|---|---|
| 6,122,657 | A * | 9/2000 | Hoffman et al. | ............. 709/201 |
| 6,209,029 | B1 | 3/2001 | Epstein et al. | |
| 6,347,344 | B1 * | 2/2002 | Baker et al. | ................... 710/20 |
| 6,539,361 | B1 | 3/2003 | Richards et al. | |
| 6,901,382 | B1 * | 5/2005 | Richards et al. | ............... 705/35 |
| 7,025,255 | B1 * | 4/2006 | Drummond et al. | ......... 235/379 |
| 7,127,527 | B1 * | 10/2006 | Greenwalt et al. | ........... 709/249 |
| 7,702,719 | B1 | 4/2010 | Betz et al. | |

(Continued)

FOREIGN PATENT DOCUMENTS

| | | |
|---|---|---|
| JP | 2000-298752 | 10/2000 |
| JP | 2001-076212 | 3/2001 |

(Continued)

OTHER PUBLICATIONS

Japanese Office Action mailed Jun. 30, 2009 in corresponding Japanese Patent Application No. 2004-208940.
U.S. Office Action mailed Mar. 8, 2010 in corresponding U.S. Appl. No. 11/103,450.
U.S. Office Action mailed Aug. 30, 2010 in corresponding U.S. Appl. No. 11/103,450.

(Continued)

*Primary Examiner* — Tuan Vu
(74) *Attorney, Agent, or Firm* — Staas & Halsey LLP

(57) ABSTRACT

An automatic transaction apparatus communicates with a Web server and performs automatic transaction according to an operation of a user, which makes it easier to create screen content for controlling automatic transaction apparatus which have different functions and units. Objects for each processing of the transaction processing are embedded in a screen content of a Web server, one method in the processing units is called up, and operation of a plurality of I/O units is controlled. This makes it easier to create a screen content which can be commonly used for different automatic transaction apparatus in a general transaction flow, also, parallel control becomes possible and high-speed I/O unit control can be implemented.

5 Claims, 21 Drawing Sheets

(56) References Cited

U.S. PATENT DOCUMENTS

| | | | |
|---|---|---|---|
| 2001/0029528 A1* | 10/2001 | Coutts et al. | 709/219 |
| 2001/0054020 A1* | 12/2001 | Barth et al. | 705/37 |
| 2002/0062369 A1* | 5/2002 | von Klopp et al. | 709/224 |
| 2002/0124100 A1* | 9/2002 | Adams | 709/232 |
| 2004/0148307 A1* | 7/2004 | Rempell | 707/102 |
| 2004/0148375 A1 | 7/2004 | Levett et al. | |
| 2005/0109831 A1 | 5/2005 | Obara et al. | |

FOREIGN PATENT DOCUMENTS

| | | |
|---|---|---|
| JP | 2001-249895 | 9/2001 |
| JP | 2002-024912 | 1/2002 |
| JP | 2005-157427 | 6/2005 |

OTHER PUBLICATIONS

U.S. Office Action mailed Jan. 28, 2011 in corresponding U.S. Appl. No. 11/103,450.

U.S. Office Action mailed Dec. 19, 2005 in corresponding U.S. Appl. No. 10/828,464.

Notice of Allowance mailed Aug. 5, 2011 in corresponding U.S. Appl. No. 11/103,450.

Notice of Allowance mailed Jul. 5, 2006 in corresponding U.S. Appl. No. 10/828,464.

U.S. Appl. No. 11/103,450, filed Apr. 12, 2005, Tomomichi Obara, Fujitsu Limited.

U.S. Appl. No. 10/828,464, filed Apr. 21, 2004, Tomomichi Obara, Fujitsu Limited.

\* cited by examiner

FIG. 6

| COMMAND TYPE | COMMAND |
|---|---|
| CRW COMMAND | CARD INSERTION |
| | CARD EJECT |
| RPR COMMAND | PRINT |
| | RELEASE |
| PPR COMMAND | PASSBOOK INSERTION |
| | PRINT |
| | MS WRITE |
| | PASSBOOK EJECT |
| | AUTO TURN PAGE |
| BRU COMMAND (CRU COMMAND) | INITIALIZATION |
| | ACCEPTANCE/COUNTING |
| | STORE |
| | DEPOSIT RETURN |
| | FEED |
| | RELEASE |
| | CAPTURE |
| | TRANSPORT PATH CHECK |
| | JAM RESET |

FIG. 7

| AGENT | METHOD | IO CONTROLLER | | | | | | | | |
|---|---|---|---|---|---|---|---|---|---|---|
| | | NONE | BILL | COIN | PAS BOOK | CARD | RECEIPT | JOURNAL | TRANS-ACTION | TEN KEY |
| SYNCHRONIZATION | INITIALIZE | | ● | ● | ● | ● | ● | ● | ● | ● |
| | MECHANISM RESET | | ● | ● | ● | ● | ● | ● | | |
| | BILL/COIN INSERT | | ● | ● | | | | | | |
| | MEDIUM SIMULTANEOUS EJECT | | ● | ● | ● | ● | ● | | | |
| | PRINT/FEED/MS WRITE/EJECT PREPARE | | ● | ● | ● | ● | ● | ● | | |
| | DEPOSIT RETURN | | ● | ● | | | | | | |
| | STORAGE | | ● | ● | | | | | | |
| | FORCE-EJECT/CAPTURE | | ● | ● | ● | ● | ● | | | |
| | OBTAIN UNIT INFORMATION/SET TRANSACTION STATUS/TWO-SCREEN DISPLAY | | ● | ● | ● | ● | ● | ● | ● | ● |
| | DEPOSIT/WITHDRAWAL PREPARE | | ● | ● | | | | | | |
| | FORCE REPLENISH | | ● | ● | | | | | | |
| | JAM RESET | | | | ● | ● | | | | |
| POST | POST PROCESS | ● | | | | | | | | |
| | POST DATA HOLD | ● | | | | | | | | |
| TEXT DISPLAY | FONT SET | ● | | | | | | | | |
| | TEXT DISPLAY | ● | | | | | | | | |
| | TEXT ERASE | ● | | | | | | | | |

FIG. 8

| AGENT | METHOD | IO CONTROLLER ||||||||
| | | NONE | BILL | COIN | PASBOOK | CARD | RECEIPT | JOURNAL | TRANSACTION | TEN KEY |
|---|---|---|---|---|---|---|---|---|---|---|
| BILL CONTROL | RECEIPT/COUNTING<br>STORAGE<br>DEPOSIT RETURN<br>RELEASE<br>CANCEL | | ●●●●● | | | | | | | |
| PASSBOOK CONTROL | PRINT LINE SET/PAGE MARK READ<br>MS READ<br>AUTO TURN PAGE<br>PAGE CHECK AUTO TURN<br>SET PASSBOOK TYPE INFORMATION | | | | ●●●●● | | | | | |
| CARD CONTROL | CARD INSERT<br>CANCEL<br>MONEY TRANSFER CARD PRINT<br>MONEY TRANSFER CARD ISSUE<br>EJECT PREPARE | | | | | ●●●●● | | | | |
| RECEIPT CONTROL | REGISTER OVERLAY<br>EJECT PREPARE | | | | | | ●● | | | |
| TRANSACTION CONTROL | SET TRANSACTION INFORMATION<br>MONITOR DEVICE STATUS<br>OBTAIN DEVICE STATUS<br>SET OSPERATION INFORMATION<br>CANCEL | | | | | | | | ●●●●● | |
| TEN KEY | TEN KEY INPUT START<br>TEN KEY INPUT END | | | | | | | | | ●● |

FIG. 9

```
<HTML>
<HEAD>
<TITLE>WebATM Sample</TITLE>
</HEAD>
<BODY>

// SPECIFY AGENT WHICH IS CALLED UP IN THE SCREEN
<APPLET CODE="U_agtSync_.class" codebase = "http://webatm:8080/webatm"
       WIDTH="0" HEIGHT="0" NAME="U_agtSync" >
</APPLET>

// MAKE MAYSCRIPT DEFINITION SUCH THAT POSTAgent CALLS UP FUNCTION OF Java Script
<APPLET CODE="U_agtPost.class" codebase = "http://webatm:8080/webatm"
WIDTH="0" HEIGHT="0" NAME="U_agtPost" MAYSCRIPT>

<SCRIPT language="javascript">
<!--
        // DEFINE FUNCTION THAT IS CALLED UP FROM POSTAgent (REQUISITE)
        function postFunc(postData){ document.sys_form.ioResponse.value = postData;
                    window.document.sys_form.submit();
        }

// CALL UP INITIAL METHOD IN SYNCHRONIZATION Agent
        ret = document.U_agtSync_.initial (inputParam, parseInt(postMode), parseInt(maxTimer));
        if (ret < 0) {
                // ABNORMAL NOTIFY PROCESS
                ~OMIT~
        }

//-->
</SCRIPT>
</BODY>
</HTML>
```

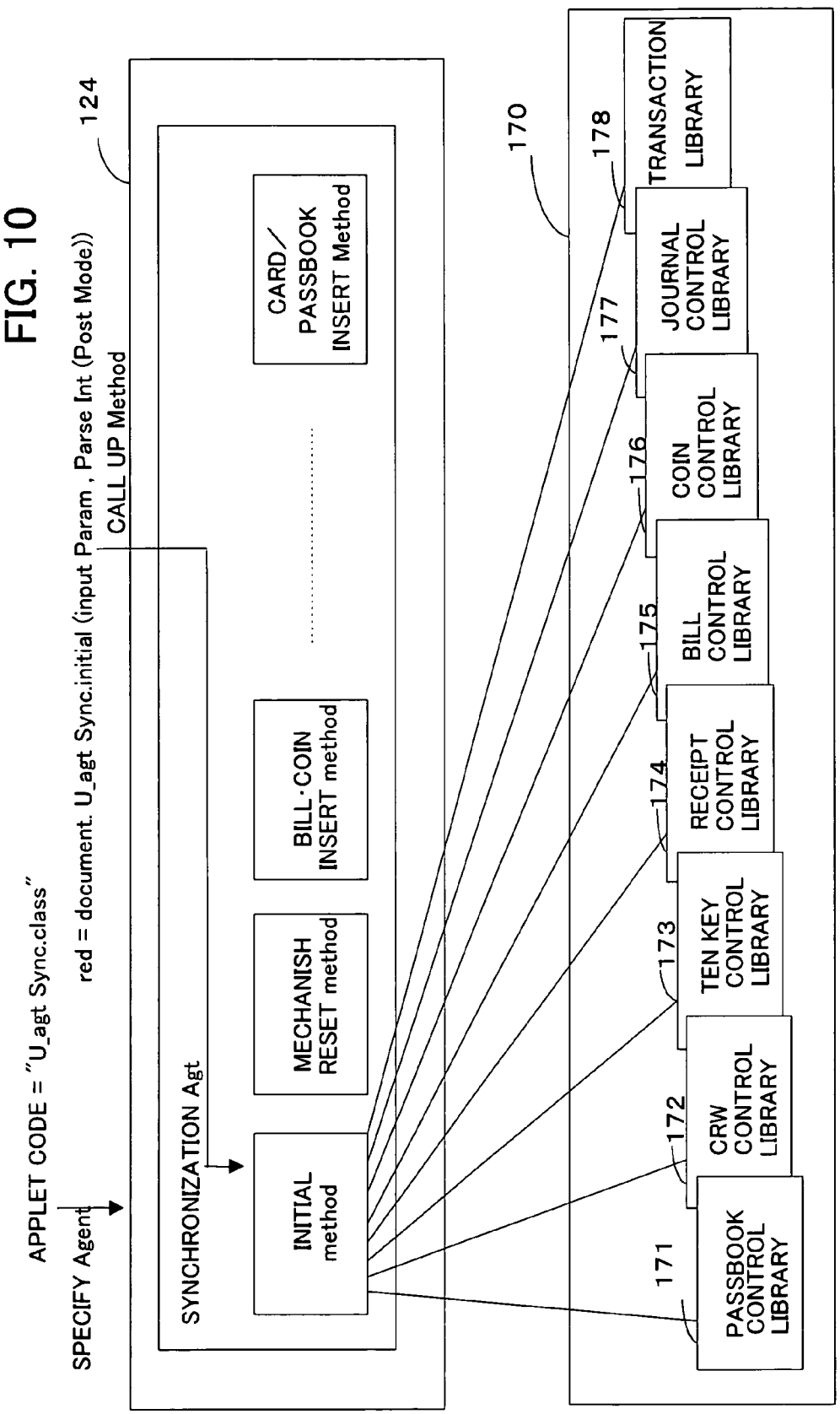

Input Param

| 1 | 1 | 1 | 1 | 1 | 1 | 1 | 1 |
|---|---|---|---|---|---|---|---|
| BILL | COIN | PASSBOOK | CARD | RECEIPT | JOURNAL | TRANSACTION | TEN KEY |

FIG. 16

| ITEM | PROCESS | COMMON INTERFACE | VENDOR SPECIFIC INTERFACE |
|---|---|---|---|
| 1 | UNIT INITIALIZE PROCESS | | PASSBOOK PRINTER USER TYPE CODE |
| 2 | | | PASSBOOK RIBBON NEAR END CHECK SPECIFICATION |
| 3 | | | PASSBOOK MS WRITE ERROR PAUSE SPECIFICATION |
| 4 | | | PASSBOOK PAGE MARK UP/DOWN USE SPECIFICATION |
| 5 | | | FORGOTTON PASSBOOK TAKE-IN/CLOSE SPECIFICATION |
| 6 | PASSBOOK INSERT PROCESS | INSERT MEDIUM LOGICAL TYPE SPECIFICATION | |
| 7 | | PASSBOOK TYPE NO. SPECIFICATION | |
| 8 | | W-MS CHANGE SPECIFICATION | |
| 9 | | STRIPE POSITION SPECIFICATION | |
| 10 | | MS ERASE SPECIFICATION | |
| 11 | | SPECIFIED LINE POSITION SPECIFICATION | |
| 12 | | COMPOSIT OPERATION SPECIFICATION | |
| 13 | | CAMERA CONTROL SPECIFICATION | |
| 14 | | | MS POSITION |
| 15 | | | MS FORMAT |
| 16 | | | MS PARAMETER |
| 17 | | | LINE LAMP CONTROL DESIGNATION |

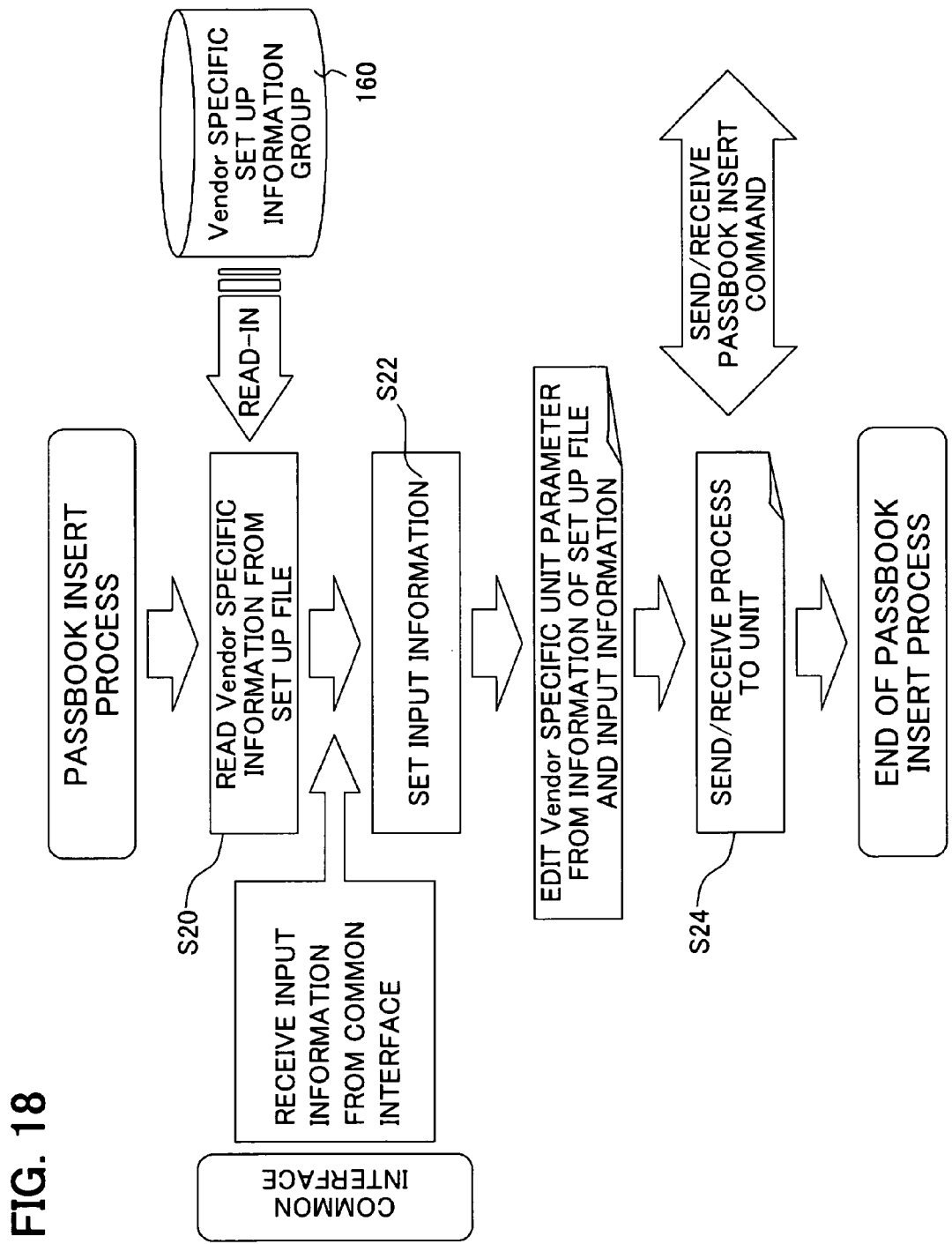

FIG. 19

| AGENT | METHOD | IO CONTROLLER | | | | | | | | |
|---|---|---|---|---|---|---|---|---|---|---|
| | | NONE | BILL | COIN | PASBOOK | CARD | RECEIPT | JOURNAL | TRANSACTION | TEN KEY |
| SYNCHRONIZATION | INITIALIZE | | • | • | • | • | • | • | • | • |
| SYNCHRONIZATION | MECHANISM RESET | | • | • | • | • | • | • | | |
| SYNCHRONIZATION | BILL/COIN INSERT | | • | • | | | | | | |
| SYNCHRONIZATION | MEDIUM SIMULTANEOUS EJECT | | • | • | • | • | • | | | |
| SYNCHRONIZATION | PRINT/FEED/MS WRITE/EJECT PREPARE | | • | • | • | • | • | • | | |
| SYNCHRONIZATION | DEPOSIT RETURN | | • | • | | | | | | |
| SYNCHRONIZATION | STORAGE | | • | • | | | | | | |
| SYNCHRONIZATION | FORCE-EJECT/CAPTURE | | | | • | • | • | | | |
| SYNCHRONIZATION | OBTAIN UNIT INFORMATION/SET TRANSACTION STATUS/TWO-SCREEN DISPLAY | | • | • | • | • | • | • | • | • |
| SYNCHRONIZATION | CANCEL | | | | | | | | | |
| SYNCHRONIZATION | DEPOSIT/WITHDRAWAL PREPARE | | • | • | | | | | | |
| SYNCHRONIZATION | FORCE REPLENISH | | • | • | | | | | | |
| SYNCHRONIZATION | JAM RESET | | | | • | • | | | | |
| SYNCHRONIZATION | CARD/PASSBOOK INSERT | | | | | | | | | |
| POST | POST PROCESS | • | | | | | | | | |
| POST | POST DATA HOLD | • | | | | | | | | |
| TEXT DISPLAY | FONT SET | • | | | | | | | | |
| TEXT DISPLAY | TEXT DISPLAY | • | | | | | | | | |
| TEXT DISPLAY | TEXT ERASE | • | | | | | | | | |

FIG. 20

```
<HTML>
<HEAD>
<TITLE>WebATM Sample</TITLE>
</HEAD>

<BODY>

// SPECIFY Agent WHICH IS CALLS UP IN THE SCREEN
<APPLET CODE="U_agtSync_initial.class" codebase = "http://webatm:8080/webatm"
        WIDTH="0" HEIGHT="0" NAME="U_agtSync_initial" >
</APPLET>

// MAKE MAYSCRIPT DEFINITION SUCH THAT POSTAgent CALLS UP FUNCTION of JavaScript
<APPLET CODE="U_agtPost.class" codebase = "http://webatm:8080/webatm"
        WIDTH="0" HEIGHT="0" NAME="U_agtPost" MAYSCRIPT>

<SCRIPT language="javascript">
<!--
    // DEFINE FUNCTION THAT IS CALLED UP FROM POSTAgent (REQUISITE)
    function postFunc(postData){ document.sys_form.ioResponse.value = postData;
    window.document.sys_form.submit();
    }

// CALL UP INITIAL METHOD IN SYNCHRONIZATION Agent
    ret = document.U_agtSync_initial.initial (inputParam, parseInt(postMode), parseInt(maxTimer));
    if (ret < 0) {
        // ABNORMAL NOTIFY PROCESS
        ~OMIT~
    }
//-->
</SCRIPT>
</BODY>
</HTML>
```

FIG. 22  PRIOR ART

```
<HTML>
(PROGRAM DISCRIPTION OF SCREEN IMAGE) OMIT
<applet code=MachineIF.class codebase=MachineIF id=IDMachinesIF>
</applet> ·································· (D1)
<script>
// INITIALIZE EACH DEVICE
FunctionInitialize{
        IDMachineIF. Initialize("Cash");
        IDMachineIF. Initialize("Card");
        IDMachineIF. Initialize("Receipt");
        IDMachineIF. Initialize("Passbook");
}
</script>
(PROGRAM DISCRIPTION OF SCREEN IMAGE) OMIT
</HTML>
```

FIG. 23  PRIOR ART

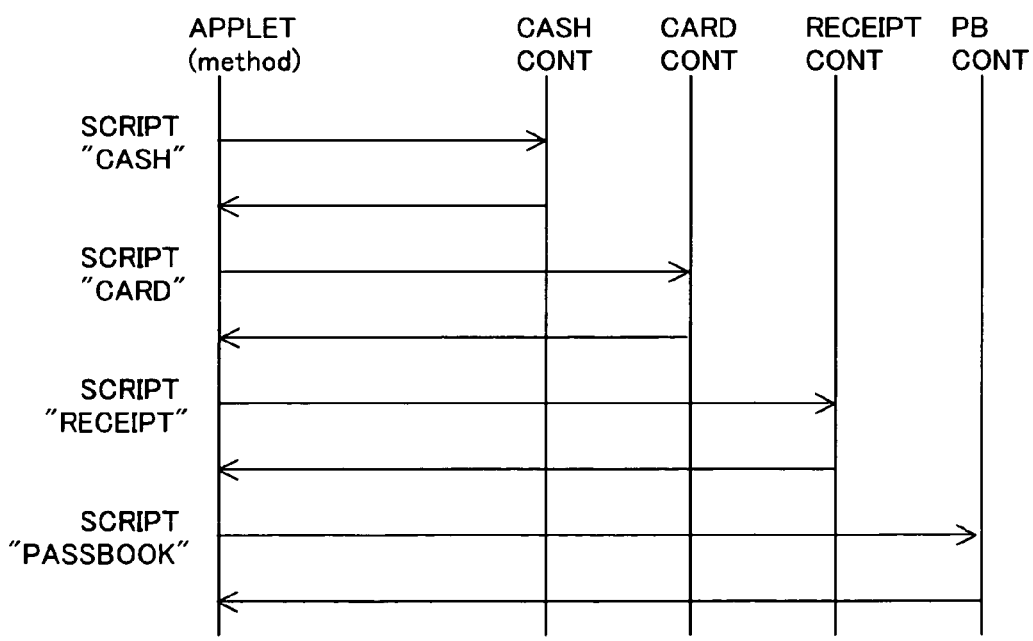

AUTOMATIC TRANSACTION APPARATUS AND AUTOMATIC TRANSACTION SYSTEM

CROSS-REFERENCE TO RELATED APPLICATIONS

This application is based upon and claims the benefit of priority from the prior Japanese Patent Application No. 2003-390478, filed on Nov. 20, 2003, the entire contents of which are incorporated herein by reference.

BACKGROUND OF THE INVENTION

1. Field of the Invention

The present invention relates to an automatic transaction apparatus and automatic transaction system which execute screen control and automatic transaction operations according to the screen content from the Web server, and more particularly to an automatic transaction apparatus and automatic transaction system which operates by the screen content, where the screen information and apparatus control information related to the screen are embedded.

2. Description of the Related Art

Automatic transaction apparatuss are used for various transactions, and in the financial field, for example, automatic withdrawal machines and automatic deposit/withdrawal machines are used, and in other fields, automatic ticket machines and automatic issuing machines are used. In such automatic transaction apparatuss, automatic transaction apparatuss for depositing/withdrawing, issuing tickets and outputting various information using Web technology are provided as such networks as the Internet currently develop.

FIG. 21 is a block diagram of a conventional automatic transaction system, and shows an ATM (Automatic Teller Machine) for financial operations. As FIG. 21 shows, the WWW (World Wide Web) server 300 and the automatic cash transaction apparatus 400 are connected via a network.

According to the request of the automatic transaction apparatus (ATM) 400, which is a client, the server 300 transmits the Web page (screen content) 500 to the ATM 400. This Web page is created with a program for creating a screen to be displayed on the display device using a page description language (HTML, JAVA (registered trademark) script), and relating to the display content of this one page (one screen), the control program of another device (e.g. card processing device, cash processing device, pass book processing device, itemized slip processing device), for which drive is controlled, is embedded as an object.

For example, as FIG. 21 shows, the Web page 500 is comprised of a screen creation program, applet tag for specifying an object (applet), screen content 502 for specifying the execution method (method) by script, and applet 510 which sets the program for executing the method of the object (applet), using the page description language HTML (Hyper Text Markup Language.

This Web page 500 is downloaded from the WWW server 300 to the browser 410 of the ATM 400. In the ATM 400, on the other hand, the ATM middleware operates under the control of a kernel (OS), and performs I/O operations (transaction operations). The ATM 400 has a card reader/writer unit 440, receipt/journal printer 441, bill/coin processing unit 442, passbook processing unit 443 and customer operation panel as the I/O mechanical units.

According to the screen creation program of the Web page, the browser 410 displays the screen on the customer operation panel, analyzes the applet tag of the screen content 502 and the method name, executes the corresponding program of the applet 510, and issues commands to the I/O units 440-443.

In such ATM control by a Web browser, it is proposed to specify the operation method (initialization in this example) of each device using the script (Java script) of the screen content 502 by specifying the device interface sorting section (machine ID) as an embedded object (applet) of the screen content 502 for each device (e.g. cash processing device) as shown in FIG. 21 and FIG. 22 (e.g. Japanese Patent Application Laid-Open No. 2000-298752).

In this method, the device interface sorting section 420 is specified by the applet tag of the screen content 502, and the device sorting section 420 sequentially reads the script, decodes it, sorts it to the interface sections 430-433 which handles the operation instructions, and operates the corresponding I/O units 440-443.

This example shows the case of the device initialization operation command, so as FIG. 23 shows, the Initialize ("cash") Script in the screen content is read, the initialization command is sent to the controller of the cash processing device 442, the initialization completion reply is received, then the Initialize ("card") Script is read, the initialization command is sent to the controller of the card processing device 440, and the initialization completion reply is received. Hereafter Initialize ( ) Script is sequentially read, the initialization command is sent to the controller of the corresponding processing device, the initialization completion reply is received, and processing ends.

In this proposal, when ATMs with the same functions are controlled via the Web, a plurality of units can be operated by one applet tag of the screen content, the description of the HTML of the screen content can be short, and the embedded object can be simple.

However ATMs do not always have the same function, for there are many ATMs which have different functions. For example, cash processing functions are processing bills and coins or processing only bills, or some ATMs execute pass book processing while others do not, or some ATMs execute deposit/withdrawal processing and other execute only withdrawal.

In order to Web-control such ATMs with different functions, the script itself of the screen content must be changed considerably, even with a same applet tag, according to the constituting functions and units, since the method to be called up is for each unit in the case of the prior art. In other words, the description of the screen content must be designed according to the differences of the constituting functions and units of the ATM to be controlled.

Therefore it takes enormous effort to develop a Web page on a WWW server 300, and it takes time to add new functions (e.g. link function with a portable telephone).

In the prior art, a method is called up for each unit, so the script of the screen content must be created for each unit. Therefore, as the above example of initialization shown in FIG. 23 shows, the command is issued and the reply is received for each script in order to control the synchronization of the plurality of units, therefore the synchronization control takes time, and the time for a user to use the automatic transaction apparatus becomes lengthy, which drops the operation rate, and increases the reply wait time.

SUMMARY OF THE INVENTION

With the foregoing in view, it is an object of the present invention to provide an automatic transaction apparatus and automatic transaction system for controlling a plurality of automatic transaction apparatus which have different functions with decreasing the change of description of objects in the screen content.

It is another object of the present invention to provide an automatic transaction apparatus and an automatic transaction system for simplifying the creation of a Web page of the Web server when a plurality of automatic transaction apparatus which have different functions are controlled.

It is still another object of the present invention to provide an automatic transaction apparatus and an automatic transaction system for improving the speed of synchronization control of a plurality of different units even using Web control, and decreasing the reply wait time.

To achieve these objects, the automatic transaction apparatus of the present invention is an automatic transaction apparatus for communicating with a Web server and performing guide display and transaction operation according to the operation of the user, having a display unit for performing the guide display, a plurality of I/O units for performing the transaction operation, and a control unit for controlling the guide display of the screen of the display unit according to the screen content from the Web server, and controlling the plurality of I/O units according to the objects embedded in the screen content. And the control unit calls up a method for each processing of the transaction operation for controlling the synchronization of the plurality of I/O units by the script of the object, and controls the synchronization of the plurality of I/O units.

The automatic transaction system of the present invention has a Web server, and an automatic transaction apparatus which is connected to the Web server via a network for communicating with the Web server and performing guide display and transaction operation according to the operation of a user. And the automatic transaction apparatus has a display unit for performing the guide display, a plurality of I/O units for performing the transaction operation, and a control unit for controlling the guide display of the screen of the display unit according to the screen content from the Web server, and controlling the plurality of I/O units according to the objects embedded in the screen content. And the control unit calls up the method for each processing of the transaction operation for controlling the synchronization of the plurality of I/O units by the script of the object, and controls the synchronization of the plurality of I/O units.

In the present invention, it is preferable that the control unit has a browser which interprets the screen content from the Web server, and performs the guide display, and also interprets the script of the object embedded in the screen content, and calls up the method for each processing of the transaction operation for controlling the synchronization of the plurality of I/O units, and controls the synchronization of the plurality of I/O units from the browser.

In the present invention, it is preferable that the control unit transmits the request to the Web server according to the post request by the called up method.

In the present invention, it is preferable that the control unit receives the screen content which has the screen creation program described by a page description language, the script of the object, and the method program called up by the script.

In the present invention, it is preferable that the control unit issues the operation command to the plurality of I/O units by the called up method, and receives the reply from the I/O units.

In the present invention, it is preferable that the plurality of I/O units has at least a cash processing unit and a card processing unit.

In the present invention, it is preferable that the control unit specifies the plurality of I/O units for which synchronization is controlled by the method according to the input parameters attached to the script.

In the present invention, it is preferable that the browser creates the guide screen by the screen creation program described by the page description language of the screen content, calls up the method program from the script of the object, and controls the synchronization of the plurality of I/O units.

In the present invention, it is preferable that the browser creates the guide screen by the screen creation program described by the page description language of the screen content, calls up the method program of an applet from the applet specifications and the method specifications of the script of the object, and controls the synchronization of the plurality of I/O units.

In the present invention, it is preferable that the browser issues an operation command to a plurality of I/O controllers for controlling each of the I/O units by the called up method, and receives replies from the I/O controllers.

According to the present invention, objects for each processing of the transaction processing are embedded in the screen content of the Web server, and one method for each processing is called up, so the operation of a plurality of I/O units can be controlled, and the I/O units can be commonly used for different automatic transaction apparatus with a general transaction flow. Therefore screen content for Web-controlling automatic transaction apparatus with different functions and configurations can be easily created.

Also one method is called up, so parallel control is possible and high-speed I/O unit control can be implemented. By this, the wait time of a user for the automatic transaction apparatus can be decreased, and the operation rate can be improved.

BRIEF DESCRIPTION OF THE DRAWINGS

FIG. 6 is a table showing the transaction commands of the common interface in FIG. 3 and FIG. 5;

FIG. 7 is a table describing the agents in FIG. 3 and FIG. 4;

FIG. 8 is a table describing other agents in FIG. 3 and FIG. 4;

FIG. 9 shows the screen content in FIG. 3 and FIG. 4;

FIG. 10 is a diagram depicting the I/O control operation by the agent in FIG. 3 and FIG. 4;

FIG. 16 is a table showing common interfaces and vender specific interfaces according to an embodiment of the present invention;

FIG. 18 is a flow chart depicting interface conversion processing of the pass book insertion processing in the I/O control library;

FIG. 19 is a table describing agents according to another embodiment of the present invention;

FIG. 20 shows screen content according to another embodiment of the present invention;

FIG. 22 shows screen content of conventional Web control; and

FIG. 23 is a diagram depicting the sequence of the I/O control operation by the script of conventional screen content.

DESCRIPTION OF THE PREFERRED EMBODIMENTS

Embodiments of the present invention will now be described in the sequence of automatic transaction system, I/O control mechanism by Web control, automatic transaction processing, customization method for conventional middleware, and other embodiments.

[Automatic Transaction System]

Figure 1:
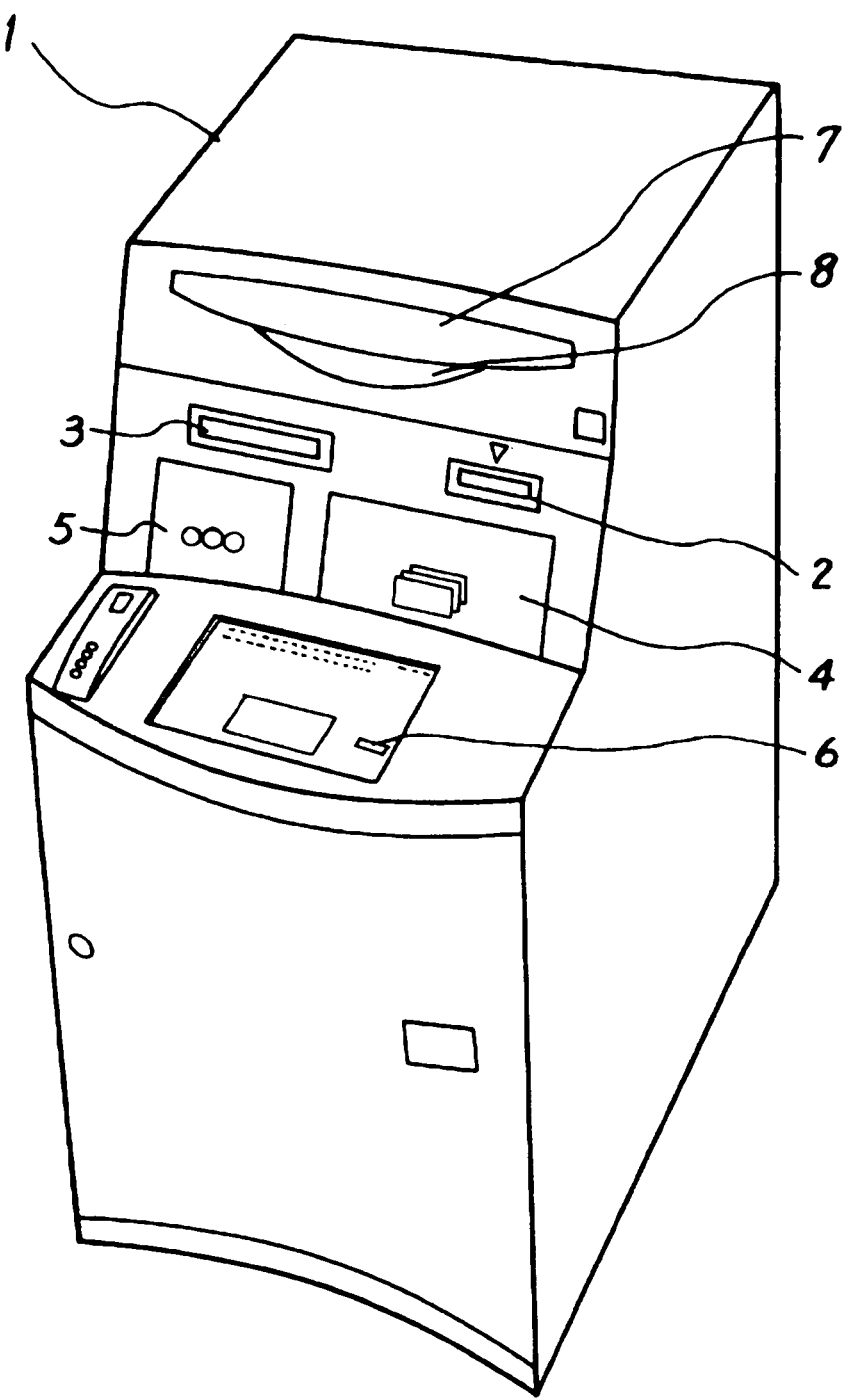
FIG. 1 is an external view of the automatic transaction apparatus according to an embodiment of the present invention.
Figure 2:
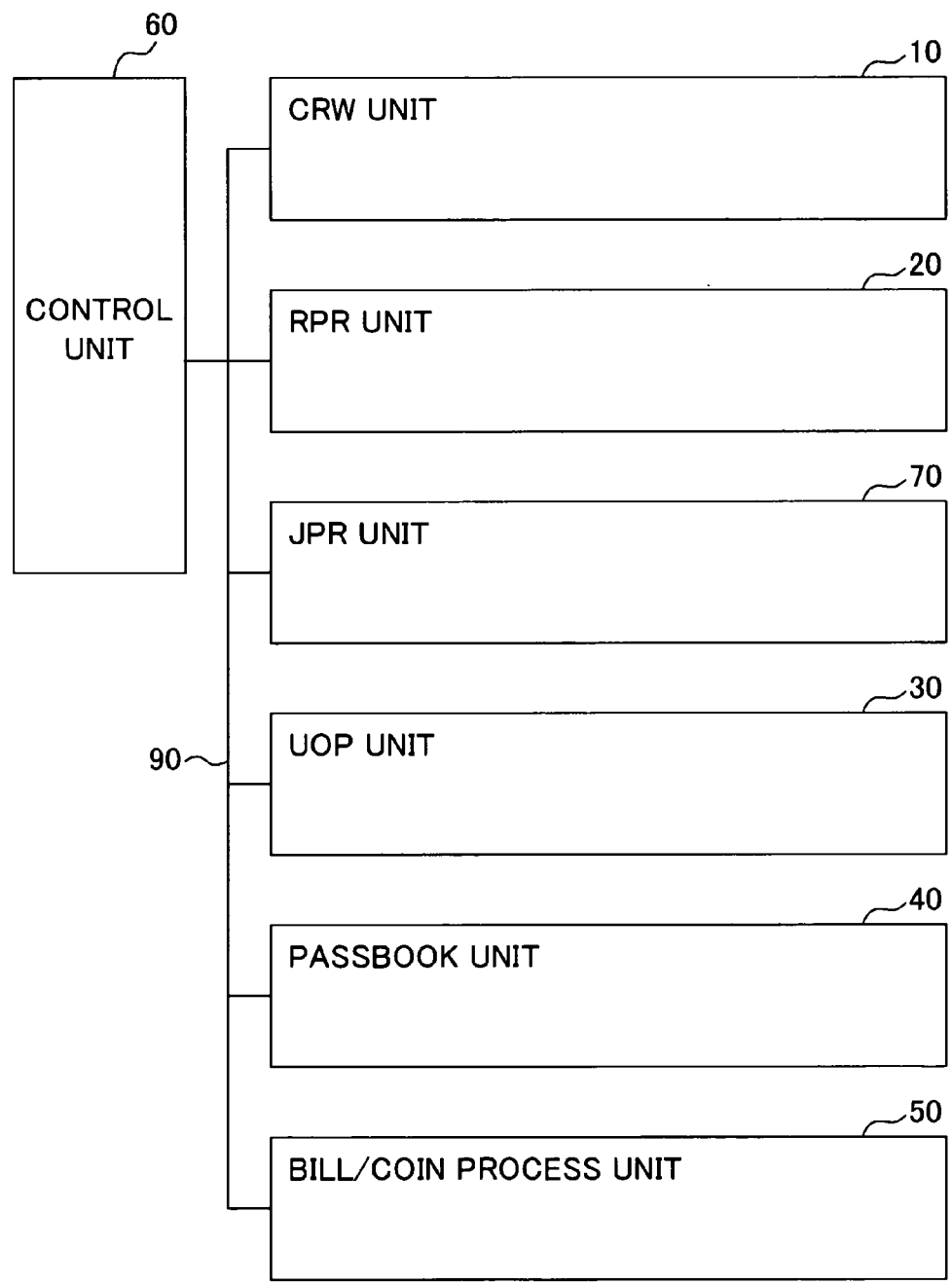
FIG. 2 is a block diagram depicting the automatic transaction apparatus in FIG. 1.
Figure 3:
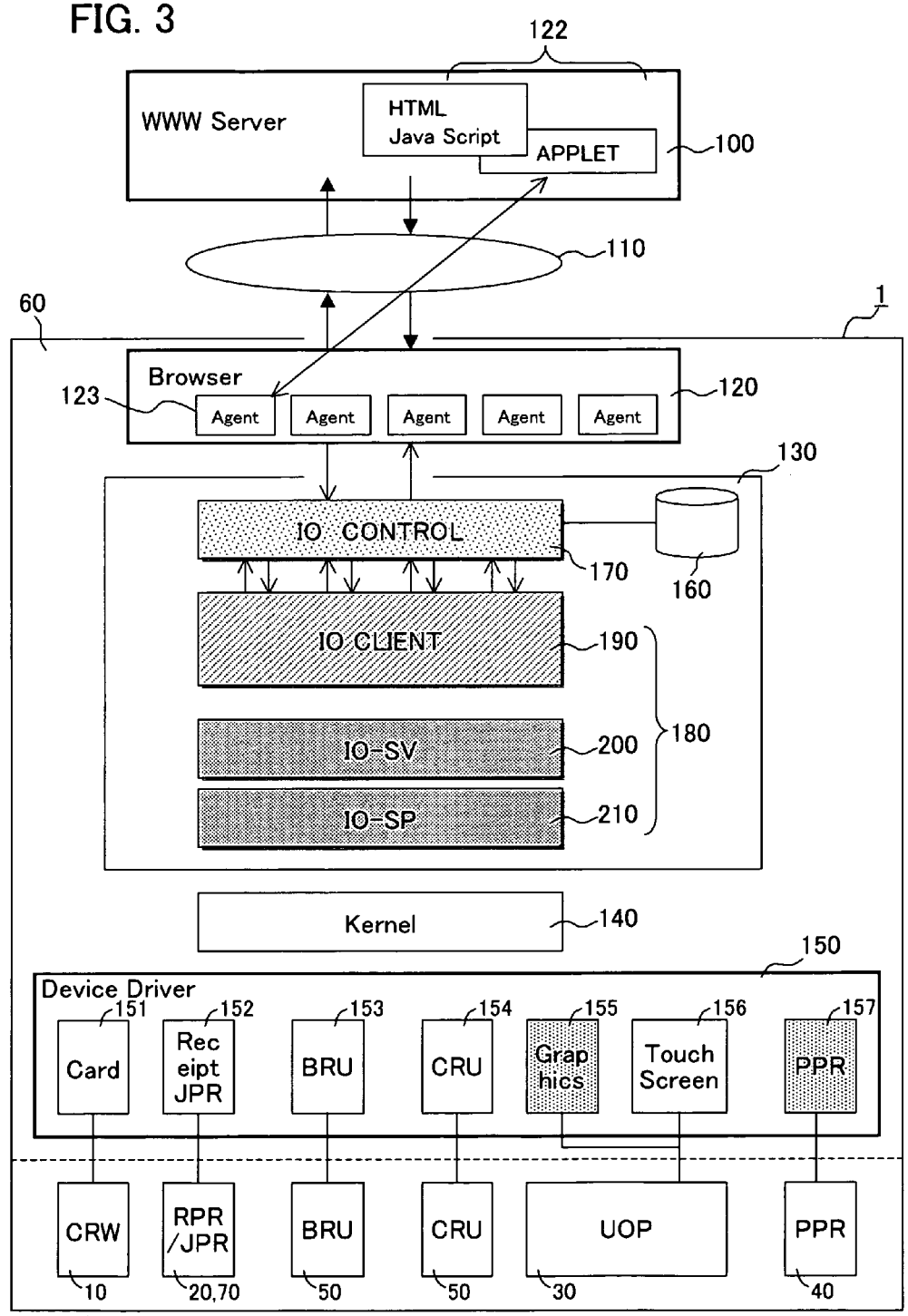
FIG. 3 is a system block diagram depicting the automatic transaction system according to an embodiment of the present invention.

FIG. 1 shows an external view of an automatic transaction apparatus according to an embodiment of the present invention, FIG. 2 is a block diagram depicting the automatic transaction apparatus in FIG. 1, and FIG. 3 is a system block diagram depicting the automatic transaction system according to an embodiment of the present invention.

As FIG. 1 shows, the automatic transaction apparatus 1 has a card entry 2 for inserting and ejecting a magnetic card, a pass book entry 3 for inserting and ejecting a magnetic pass book, a bill entry 4 for entering and ejecting bills, a coin entry 5 for entering and ejecting coins, a UOP (User Operation Panel) 6 for a user to operate, an operation display 7 for displaying the operation status to the user, and a customer sensor 8 for detecting the user.

FIG. 2 is a block diagram depicting the automatic transaction apparatus 1 in FIG. 1. A CRW (Card Reader Writer) unit 10 reads the magnetic card by the magnetic head, and returns it to the entry 2, while transporting the magnetic card inserted from the card entry (card insertion slot) 2 using a transport mechanism, which is not illustrated. The CRW unit 10 has an image sensor so as to read the magnetic card (embossed section) optically.

The RPR (Receipt Printer) unit 20 prints the transaction result on the receipt paper by the print head, and ejects the receipt to the card entry 2. The RPR unit 20 stores the receipt returned from the entry 2 when the ejected receipt is not removed by the user within a predetermined time.

The JPR (Journal Printer) unit 70 prints out the transaction status and the result on the journal printer by the print head. The UOP (User Operation Panel) unit 30 is comprised of the UOP (display with touch panel) 6 and the control circuit thereof. The pass book (PPR) processing unit 40 reads the magnetic pass book inserted from the pass book entry 3, prints the transaction on the magnetic pass book, and ejects the pass book from the pass book entry 3.

The bill/coin processing unit 50 performs the deposit operation by validating the bills and the coins entered through the bill entry 4 and the coin entry 5, counting them and storing them in stackers, and performs withdrawal operation for taking off the requested bills and coins from the cash stacker, and releasing them to the bill entry 4 and the coin entry 5.

The control section 60 is connected to these control units 10, 20, 30, 40, 50 and 70 via such a network 90 as a LAN, and performs automatic transaction processing based on the software configuration, which is mentioned later in FIG. 3.

FIG. 3 is a block diagram of the automatic transaction system according to an embodiment of the present invention. The automatic transaction apparatus 1 exchanges commands, parameters and data required for the transaction processing with the WWW (World Wide Web) server (host) 100 via such a network 110 as the Internet.

In the automatic transaction apparatus 1, the mentioned control section 60 has the browser 120, ATM middleware 130, kernel (OS) 140 and device driver 150.

The device driver 150 is comprised of a card unit driver 151 for driving the card (CRW) unit 10, a receipt/journal unit driver 152 for driving the receipt/journal units (RPR/JPR) 20 and 70, a BRU driver 153 for driving the BRU, (bill) unit 50, a CRU driver 154 for driving the CRU (coin) unit 50, a graphic driver 155 for driving the UOP 30, a touch screen driver 156, and a PPR driver 157 for driving the pass book unit 40.

The browser 120, which is a Web browser, such as. Internet Explorer (Microsoft trademark), requests the Web server 100 to transmit content, and interprets and displays the screen content (Web page) transmitted by the Web server 100. In this case, the browser 120 requests the Web page required for the transaction processing, which is constructed by HTML and Java script, interprets the transmitted Web page, and controls the screen of the ATM middleware 130 and the UOP 30.

The kernel 140 is a known OS (Operating System), such as Windows (registered trademark) and Linux, and under the operating environment of the kernel 140, the browser 120, ATM middleware 130 and device driver 150 operate.

The ATM middleware 130 is comprised of a parameter file 160, I/O control layer 170, I/O client layer 190, I/O server layer 200 and I/O service provider layer 210.

This I/O client layer 190 is for controlling an individual I/O unit installed in the apparatus, where the I/O server layer 200 starts up and ends an I/O operation and controls the communication protocol, and the I/O service provider layer 210 converts the messages for each I/O unit. These are conventional middleware 180, which were designed according to the functional range and the type of the apparatus and to the specifications of the connected I/O unit.

The I/O control layer 170, on the other hand, transmits/receives commands and data using the common application interface protocol of the Web server 100 and the middleware. The functional ranges of the apparatus are different from each other, depending on the model of the apparatus, so the common application interface (API) is comprised of common commands and data systems that can operate all models, which will be described later in FIG. 6.

The I/O control layer 170 integrates the application interface (API) of the I/O client layer 190, and constructs a more abstract common API. The parameter file 160 is for storing the input parameters/fixed parameters which are uniquely determined by the system specifications specific to the vender (ATM manufacturer).

The I/O control layer 170 calls up parameters specific to each client layer from this parameter file 160 when calling up the I/O client layer 190, and converts the common API into the conventional client API.

By this, the highly abstract common API can be converted into a client API, matching the ATM middleware 190 of the automatic transaction apparatus 1 and the type of the installed I/O units, and the conventional ATM middleware 180 and the I/O unit can be operated. In other words, a conventional. ATM middleware can be customized so as to operate with a common API.

As FIG. 3 shows, in the present invention, the agent 123 defined for each processing of the ATM is embedded as an applet of the screen content 122 of the Web page, and operation of the I/O units required for processing are controlled for each processing. Details will be described in FIG. 4 and later, but the applet name is defined for each processing, such as synchronization control and initialization control of synchronization control (hereafter called Agent), and the method is also provided for each a processing. In other words, an applet (Agent) having a method for controlling the operation of the I/O unit corresponding to the processing is provided, and the applet (Agent) and the method are specified for each processing.

By this, even if a plurality of units operate synchronously, the operation can be executed for each processing, and the applet name can be assigned for each processing, so the changed locations of a Web page can be decreased in the Web control of ATMs with different functions, and a Web page can be easily created even in complicated automatic transaction control.

Since a plurality of I/O units can be controlled merely by calling up one method, a plurality of I/O units can be controlled in parallel, processing speed can be increased accordingly, the ATM control time can be decreased even if Web control is used, and the wait time for a user can be decreased.

[I/O Control Mechanism by Web Control]

Figure 4:
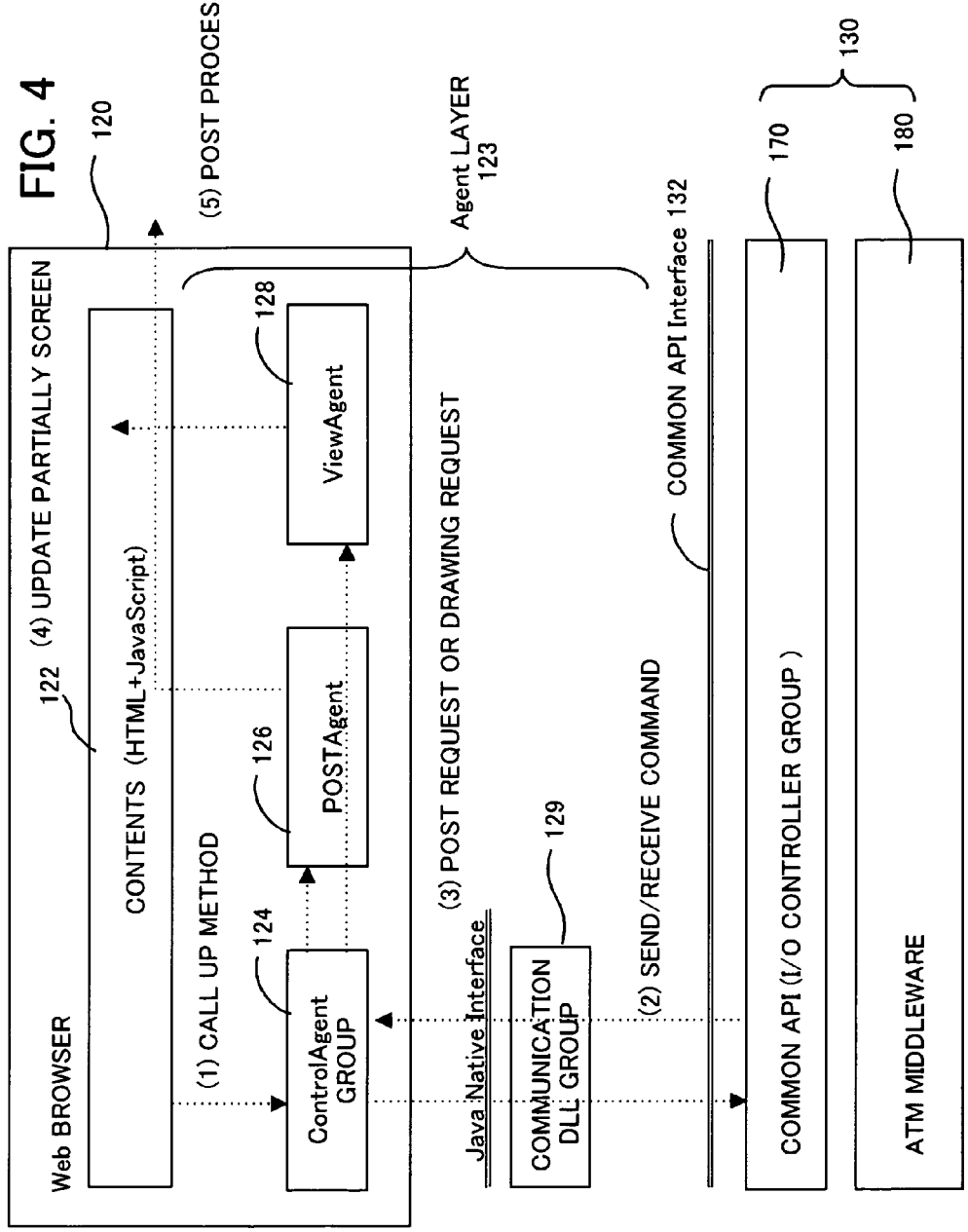
FIG. 4 is a diagram depicting the browser and screen content in FIG. 3.
Figure 5:
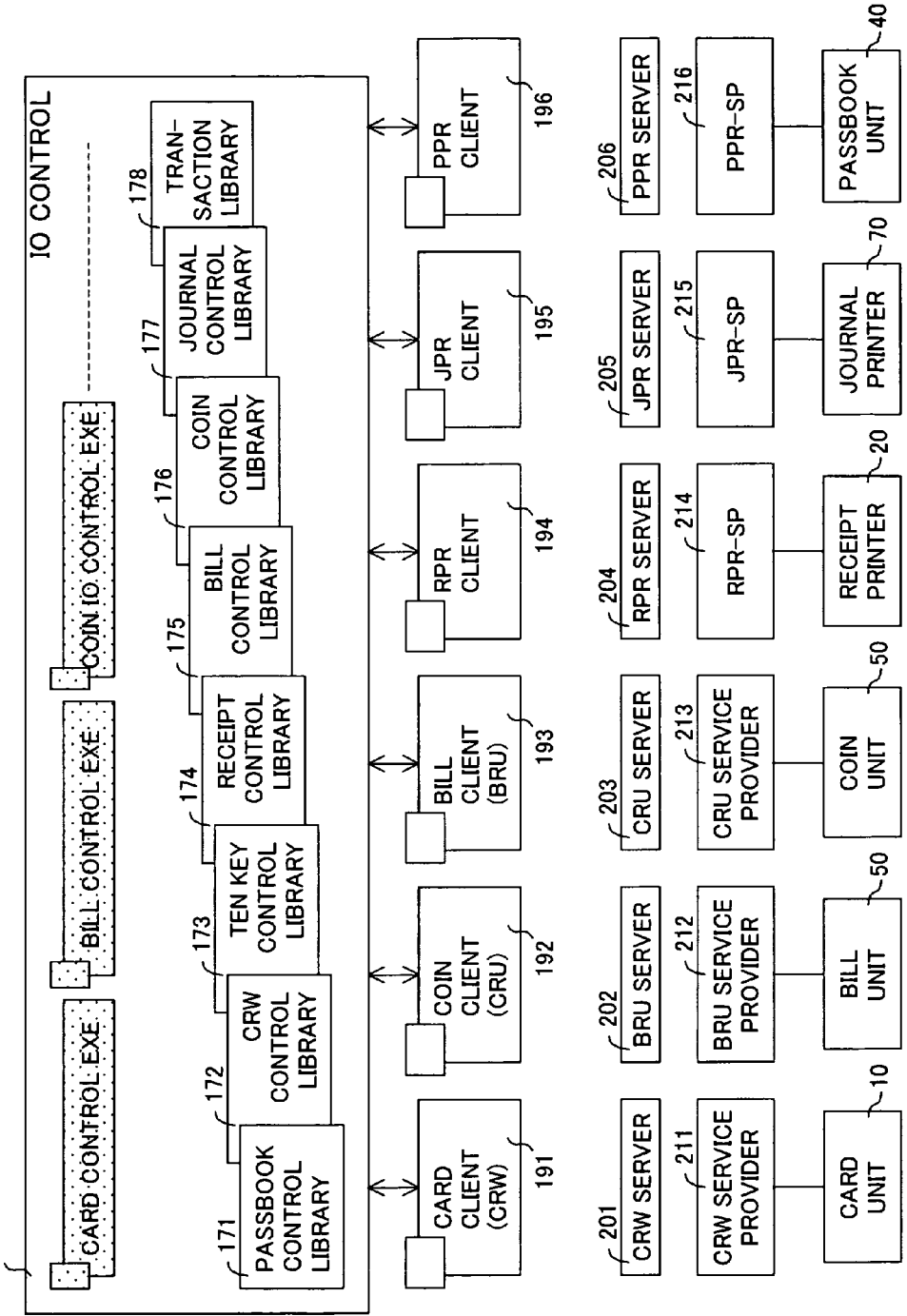
FIG. 5 is a block diagram depicting the ATM middleware in FIG. 3 and FIG. 4.

Now the I/O control mechanism by Web control will be described. FIG. 4 is a block diagram depicting the Web browser and the I/O controller in the configuration in FIG. 3, FIG. 5 is a block diagram depicting the ATM middleware in the configuration in FIG. 3, and FIG. 6 is a table showing the common API commands in FIG. 3 and FIG. 4.

As FIG. 4 shows, the screen content (HTML+Java script) 122 and the Agent (applet) 123 are downloaded from the WWW server 100 to the Web browser 120. The Agent 123 is comprised of the control Agent group 124 for controlling each unit, POST Agent 126 for performing post processing, View Agent 128 for constructing the screen, and communication DLL (Dynamic Link Library) 129 for communicating with the I/O controller 170 via the Java Native Interface and the common API interface 132.

If the interfaces are the same, then the communication DLL group 129 is unnecessary. For the control Agent group 124, only the control agents required for the display screen are downloaded. As described in detail in FIG. 7 and later, the control agent is constructed for each ATM transaction processing.

In the operation of the configuration in FIG. 4, the method of the control Agent 124 is called up by the method name described in the Java script of the screen content 122. The called up method issues a command to the I/O controller 170 via the communication DLL group 129.

The I/O controller 170 operates the corresponding unit via the ATM middleware 180, and receives the operation completion notice. The I/O controller 170 replies the command execution result to the control Agent 124. The control Agent 124 sends the post request or drawing request to the POST Agent 126 for executing post processing or to the. View Agent 128 for updating the screen, and has either POST processing or screen update processing executed.

Before describing this Agent, the common API will be described first. FIG. 6 shows an example of the command types of the common API. As CRW (Card Reader/Writer) commands, a card insertion command and a card ejection command are provided.

As RPR (Receipt Printer) commands, a printing command, release command and other commands are provided. As PPR (Pass book Printer) commands, a pass book insertion command, printing command, MS (Magnetic Stripe) write command, pass book ejection command, auto turn page command and other commands are provided.

As BRU (Bill Recycle Unit) commands, an initialization command, acceptance/counting command, storing command, deposit return command, feeding command, release command, capturing command, transport path check command, jam reset command and other commands are provided. The CRU (Coin Recycle Unit) commands are the same as the BRU commands, for which description is omitted.

The configuration of the ATM middleware 130 in FIG. 3 and FIG. 4 will now be described with reference to FIG. 5. The I/O control layer 170 has the I/O control library group (I/O controllers) 171-178 for controlling each I/O.

In this case, the I/O control library group is comprised of the pass book control library 171, CRW control library 172, ten key control library 173, receipt control library 174, bill control library 175, coin control library 176, journal control library 177 and transaction control library 178.

These control libraries 171-178 are called up by a task (e.g. card control EXE) specified by the common API, and converts the task into the client API of conventional middleware using the above mentioned parameter table 160.

The I/O client layer 190 of the conventional middleware 180 is for controlling an individual I/O unit installed in the apparatus, and in this case, the card (CRW) client 191, coin client 192, bill client 193, RPR client 194, JPR client 195 and PPR client 196 are provided.

In the same way, the I/O server layer 200 is also divided into individual I/O units for starting and ending an individual I/O operation, and controlling the communication protocol. In other words, the card (CRW) server 201, coin server 203, bill server 202, RPR (Receipt Printer) server 204, JPR server 205 and PPR (pass book printer) server 206 are provided.

In the same way, the I/O service provider layer 210 is also divided into individual I/O units for converting the messages for each I/O unit. In other words, the card (CRW) service provider 211, coin service provider 213, bill service provider 212, RPR service provider 214, JPR service provider 215 and PPR service provider 216 are provided.

In other words, the control library, the client, the server and the service provider which constitute the ATM middleware are provided corresponding to each I/O unit, and the I/O control layer 170 converts the requested commands and the parameters of the common API into the commands and the parameters of the conventional middleware API, and operates the I/O unit via the conventional middleware.

Now the above mentioned Agent will be described with reference to FIG. 7 and FIG. 8. As FIG. 7 shows, the synchronization Agent is a program for controlling the synchronization of a plurality of I/O units, and has such methods (programs) as initialization, mechanism reset, bill/coin insertion, medium simultaneous ejection, printing/feeding/MS write/ejection preparation, deposit return, storing, forced ejection/capturing, unit information acquisition/transaction status setting/two-screen display control, deposit/withdrawal preparation, forced replenishment, jam reset and card/pass book insertion.

Each method issues a command to the I/O controller indicated by a black dot in FIG. 7, and receives a reply on the command execution result. For example, the initialization method issues the initialization command to the bill controller 175, coin controller 176, pass book controller 171, card controller 172, receipt controller 174, journal controller 177, transaction controller 178 and ten key controller 173 (see FIG. 5), has each controller execute initialization processing, and receives the initialization processing result from each controller as the reply.

In the same way, the mechanism reset method issues the mechanism reset command to the bill controller 175, coin controller 176, pass book controller 171, card controller 172, receipt controller 174 and the journal controller 177 (see FIG. 5), has each controller execute mechanism reset processing, and receives the mechanism reset processing result from each controller as the reply.

In the same way, the bill/coin insertion method issues the insertion command to the bill controller 175 and coin controller 176 (see FIG. 5), has each controller execute insertion processing, and receives the insertion processing result from each controller as the reply.

In the same way, as the POST Agent, the POST processing method and the POST data holding method are provided. Also as the View (text display) Agent, the font setting method, text display method and text erasing method are provided.

Also as FIG. 8 shows, the applet for controlling a single I/O unit as well, is defined as an Agent for being controlled in a same architecture. In other words, as FIG. 8 shows, the bill control Agent, pass book control Agent, card control Agent, receipt control Agent, transaction control Agent and ten key Agent are provided.

The bill control Agent has an acceptance/counting method, storing method, deposit return method, releasing method and cancellation method for controlling each bill controller 175. The pass book control Agent has a line set/page mark read method, MS (Magnetic Stripe) read method, auto turn page method, page check auto turn method and pass book configuration information setting method for controlling each pass book controller 171.

The card control Agent has a card insertion method, cancellation method, money transfer card printing method, money transfer card issuing method and ejection preparation method for controlling each card (CRW) controller 172. The receipt control Agent has an overlay registration method and ejection preparation method for controlling each receipt controller 174.

In the same way, the transaction control Agent has a transaction information setting method, apparatus status monitoring method, apparatus status acquisition method, operation information setting method and cancellation method for controlling each transaction controller 178. The ten key Agent has a ten key input start method and ten key input end method for controlling each ten key controller 173.

The Web operation to call up these Agents and methods will be described with reference to FIG. 9 to FIG. 12. FIG. 9 shows the screen content to be transmitted by the Web server 100, and FIG. 10 is a diagram depicting the I/O control by the screen content in FIG. 9.

As FIG. 9 shows, the Agent name to be called up in the screen is specified in the screen content described with HTML (page description language). As an example; the synchronization control (Sync) Agent is called up here by the applet tag <APPLET CODE="U_agtSync.class".

Also by the description <SCRIPT Language="javaScript>, the call-up of the method of the synchronization control Agent is specified using Java script. In other words, the call-up of the initialization method of the synchronization control Agent is specified by the description ret=document.U_aqtSync.initial. Here the details of the screen display content are omitted.

When this screen content is downloaded to the browser 120, the synchronization Agent is specified by the applet tag, as shown in FIG. 10, and the initialization method is called up by the call-up method name of the SCRIPT.

As described above, the called up initialization method issues the initialization command to the bill controller 175, coin controller 176, pass book controller 171, card controller 172, receipt controller 174, journal controller 177, transaction controller 178 and ten key controller 173 (see FIG. 5), has each controller execute initialization processing, and receives the initialization processing result from each controller as the reply.

Figures 11, 12:
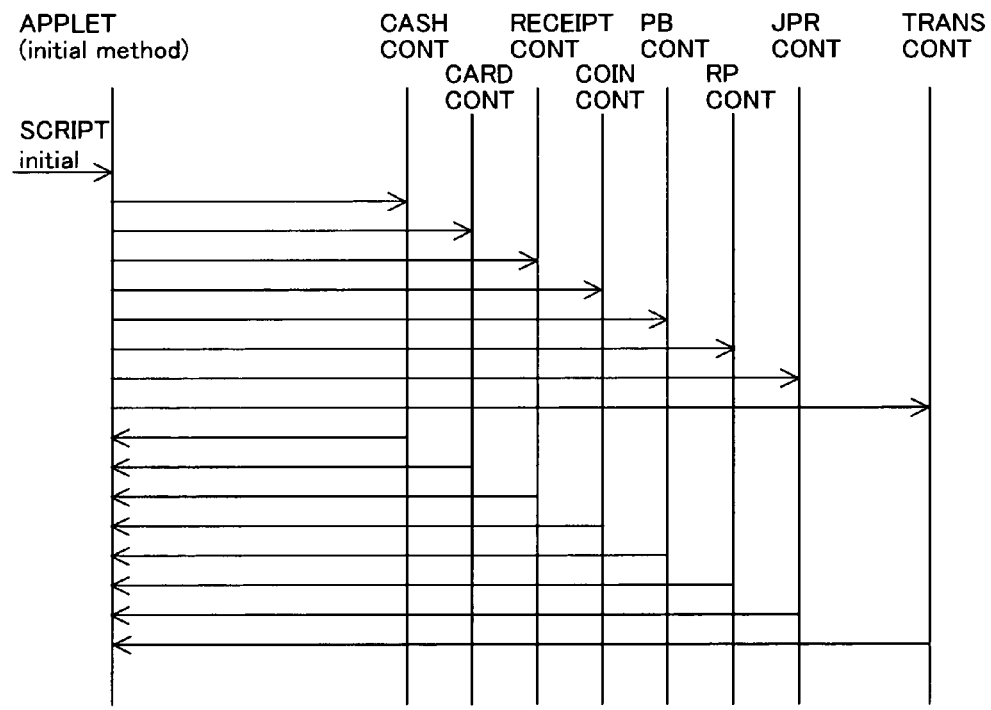
FIG. 11 is a diagram depicting the input parameter of the screen content in FIG. 9.
FIG. 12 is a diagram depicting the operation of the method of the agent in FIG. 10.

In this case, as FIG. 12 shows, the called up initialization method continuously issues the initialization command to the bill controller 175, coin controller 176, pass book controller 171, card controller 172, receipt controller 174, journal controller 177, transaction controller 178 and ten key controller (see FIG. 5), and receives the replies from these controllers sequentially as the processing completes.

Therefore the I/O units can be controlled in parallel, and even a plurality of I/O units can be controlled in a short time. Whereas in the case of the method of specifying a method for each I/O unit using conventional Script, which is a sequential control for issuing commands and receiving replies sequentially for each Script as shown in FIG. 23, it takes time to control the I/O by the Web.

Also the above mentioned Agent is provided for each processing to which a processing unit name is assigned, so ATMs with various functions can be supported with the same applet tags and method names merely by slightly changing the content of this processing unit. In this example, the content of the processing unit is changed by changing the input Param in the parenthesis of the method name of the above mentioned method call-up SCRIPT. In other words, as FIG. 11 shows, the input Param is comprised of several bytes of bit information (8-bit information in FIG. 11) for setting the input flag for each I/O controller (bill, coin, pass book, card, receipt, journal, transaction control and ten-key).

The input flag indicates that the input of the method to the I/O controller where "1" is set is enabled. The called up method refers to this input flag, and determines the I/O controller to which the command is issued. Therefore even, ATMs with different functions can execute a same processing with a same applet tag and method name by operating the input flag in the Web server 100.

For example, if the input flag of coins is set to "0" for the ATM without handling coin, issuing a command to the coin controller can be prevented. In the same way, if the pass book input flag is set to "0" in a transaction apparatus which does not handle pass books, issuing a command to the pass book controller can be prevented.

The POST Agent is specified within this agent by ParseInt (postMode) in the parenthesis of the method name of the SCRIPT. Therefore POST processing can be smoothly executed by the agent. The data can be posted at the timing when the agent received all the command completions.

[Automatic Transaction Processing]

Figure 13:
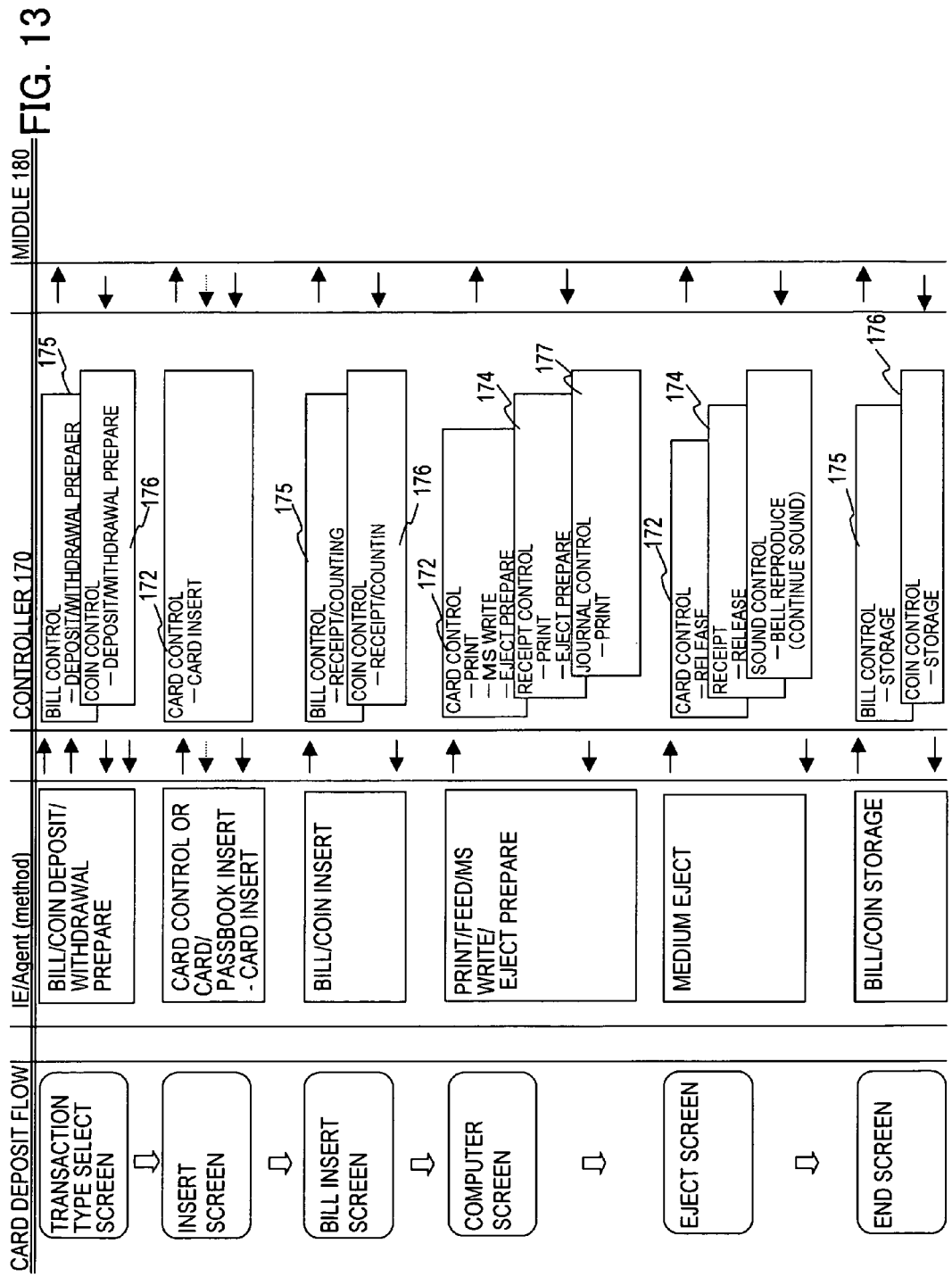
FIG. 13 is a diagram depicting deposit processing according to an embodiment of the present invention.

Now the relationship of the screen content of the Web server 100, customer operation screen (UOP screen), Agent/ method, and I/O controller will be described using the card deposit transaction in FIG. 13 as an example.

The Web server 100 issues the transaction type select screen content and applet to the ATM 1 by JSP (Java Server Pages). In the ATM 1, the browser 120 displays the transaction type select screen on the customer operation screen of the UOP 6.

And the deposit/withdrawal preparation method of the synchronization control Agent in FIG. 7 is called up by the applet name and method name embedded in the screen content, the deposit/withdrawal preparation command is issued to the bill controller 175 and the coin controller 176 to prepare for deposit/withdrawal. When deposit/withdrawal preparation completes, both controllers 175 and 176 reply the completion to the deposit/withdrawal preparation method.

If the deposit key is pressed in the type select screen of the UOP 6, this is reported to the Web server 100. By this, the Web server 100 moves to the card start processing by JSP, and issues the screen content of the insertion processing to the ATM 1. In the ATM 1, the browser 120 displays the card insertion screen on the customer operation screen of the UOP 6.

Then the card insertion method of the card control Agent is called up by the applet name card control, which is embedded in the screen content, and the name card insertion, which is a method name, and the card insertion command is issued to the card controller 172. The controller 172 operates the card unit 10 by the card insertion command. When the card unit 10 detects the insertion of the card and reads the card, the card control library 172 replies the completion of the card insertion to the card insertion method.

And the card insertion method requests to post the transaction status (in this case, card insertion detection and card read data), and the POST Agent 126 sends the request to the Web server 100. In this case, the synchronization Agent card/pass book insertion method is called up, and this input flag (see FIG. 11) is set at the card controller, then the same control is possible.

Then the JSP of the Web server 100 issues the screen content of the cash insertion processing to the ATM 1 by the request at the end of the card insertion processing. In the ATM 1, the browser 120 displays the cash insertion screen on the customer operation screen of the UOP 6 according to the screen content. And the bill/coin insertion method of the synchronization control Agent is called up by the card control Agent, which is an applet name embedded in the screen content, and by the card insertion, which is a method name, and the acceptance/counting command is issued to the bill controller 175 and the coin controller 176.

The bill controller 175 and the coin controller 176 operate the bill unit and the coin unit 50 by the acceptance/counting command. The bill and coin units 50 opens the insertion port, detects the inserted bills and coins, closes the insertion port, and counts the inserted bills and coins. When counting ends, the bill controller 175 and the coin controller 176 replies the completion of acceptance/counting to the bill/coin insertion method. And the bill/coin insertion method requests to post the transaction status (number of accepted bills/coins and total amount), and the POST Agent 126 sends the request to the Web server 100.

Then the JSP of the Web server 100 moves to deposit processing, such as a balance update, by the request at the end of cash insertion processing, issues the screen content of the computer processing to the ATM 1, and displays the "Please Wait" screen on the customer operation screen of the UOP 6.

And the browser 120 calls up the printing/feeding/MS write/ejection preparation method (see FIG. 7) by the synchronization control Agent which is an applet name embedded in the screen content, and printing/feeding/MS write/ejection preparation which is a method name, and issues the MS write command and ejection preparation command to the card controller 172, the printing command and ejection preparation command to the receipt controller 174, and the printing command to the journal controller 177.

By this, the card unit 10 writes the magnetic stripe of the card, and prepares for ejection of the card, the receipt printer 20 prints the receipt and prepares for ejection, and the journal printer 70 prints the journal. Each controller 172, 174 and 177 replies completion to the printing/feeding/MS write/ejection preparation method by the completion of command execution.

And the printing/feeding/MS write/ejection preparation method requests to post the transaction status (ejection preparation completion in this case), and the POST Agent 126 sends the request to the Web server 100.

The JSP of the Web server 100 moves to the medium ejection processing and issues the screen content of the medium ejection to the ATM 1. In the ATM 1, the browser 120 displays the medium ejection screen on the customer operation, screen of the UOP 6. And the browser 120 calls up the medium ejection method (see FIG. 7) of the synchronization control Agent by the synchronization control Agent, which is an applet name embedded in the screen content, and medium ejection, which is a method name, and issues the releasing command to the card controller 172, releasing command to the receipt controller 174, and bell regeneration command to the sound controller, which is not illustrated.

By this, the card unit 10 releases the card, and the receipt printer 20 releases the receipt, removal of the card and receipt is detected, and if the card and receipt are not removed within a predetermined time, a continuous tone is sounded. Each controller 172 and 174 replies completion to the medium ejection method at the completion of the command execution.

And the medium ejection method requests to post the transaction status (removal completion in this case), and the POST Agent 126 sends the request to the Web server 100.

Then the JSP of the Web server 100 receives the request at the removal completion from the ATM 1, moves to the transaction end processing, and issues the screen content of the transaction end to the ATM 1. In the ATM 1, the browser 120 displays the end screen on the customer operation screen of the UOP 6. The browser 120 calls up the bill/coin method (see FIG. 7) of the synchronization control Agent by the synchronization control Agent, which is an applet name embedded in the screen content, and by the bill/coin storing, which is a method name, and issues the storing command to the bill controller 175 and the coin controller 176.

By this, the bill/coin unit 50 stores the counted bills and coins in the internal stacker. Each controller 175 and 176 replies completion to the bill/coin method at the completion of the command execution. And the bill/coin method requests to post the transaction status (storing completion in this case), and the POST Agent 126 sends the request to the Web server 100.

By this, the Web server 100 returns to the above mentioned transaction type select screen, and repeats the same processing.

In this way, the Agent for each processing of the transaction processing is embedded in the screen content of the Web server 100, and one method, which is a processing unit, is called up, so the operation of a plurality of I/O units can be controlled, and different automatic transaction apparatus can be used in common in a general transaction processing flow. Therefore the screen content for controlling automatic transaction apparatus having different functions and configurations by the Web can be easily created, parallel control is possible, and high-speed I/O unit control can be implemented. By this, the wait time of a user for the automatic transaction apparatus can be decreased, and the operation rate can be improved.

In this example, the card deposit processing was used for description, but this processing is the same for withdrawal processing, deposit processing/withdrawal processing using a pass book, account printing processing and balance inquiry.

[Customization Method of Conventional ATM Middleware]

Now a method of operation with a common interface, even if the specifications of an I/O unit and the specifications of ATM middleware differ depending on the model of ATM, will be described. In this case, designing ATM middleware itself to match the common interface decreases the significance of establishing the common interface.

Therefore a conventional ATM middleware is customized so that the conventional ATM middleware for operating and I/O unit can be utilized and be operated with a common interface.

Figure 14:
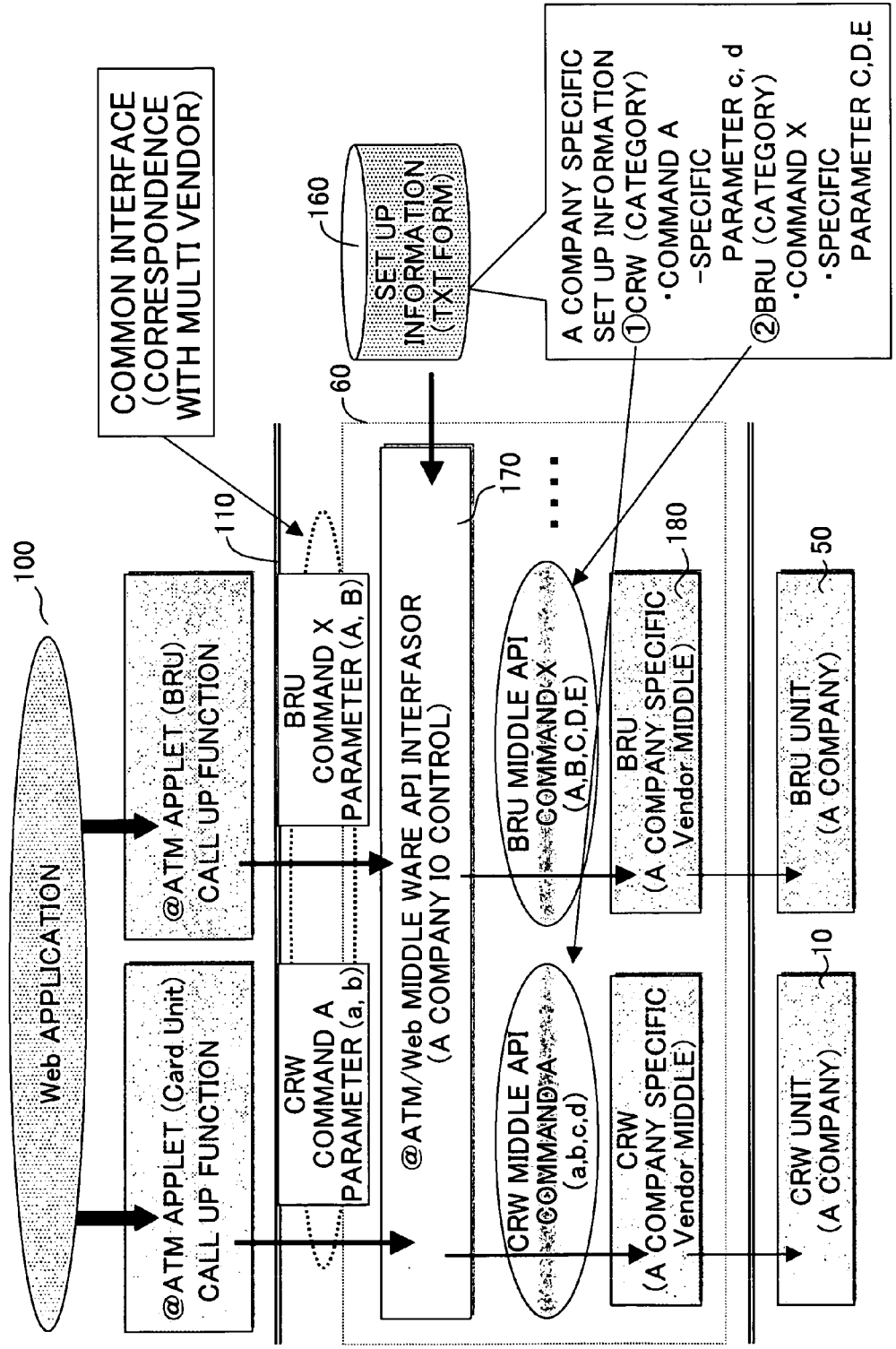
FIG. 14 is a diagram depicting the middleware API conversion operation according to an embodiment of the present invention.
Figure 15:
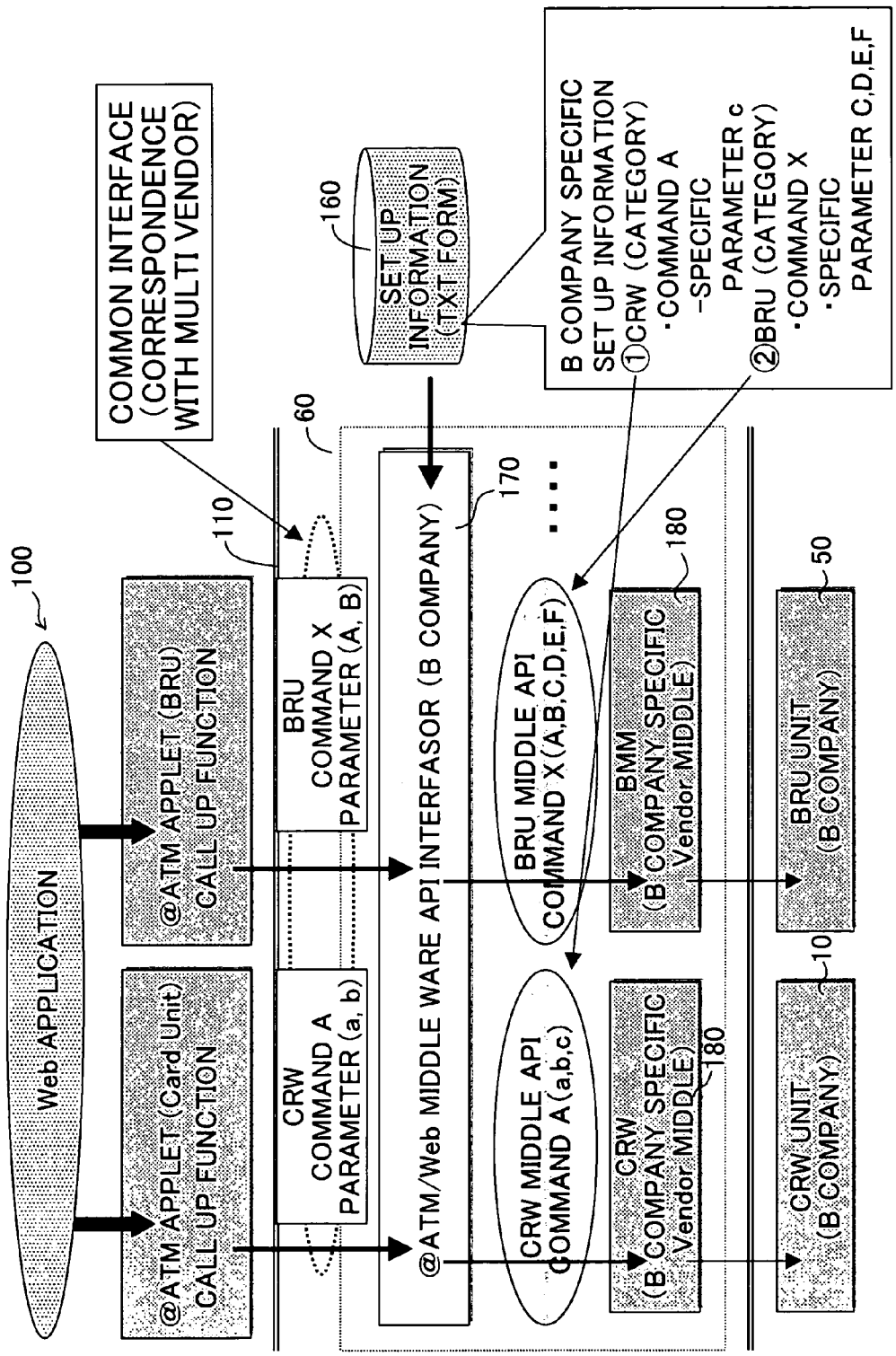
FIG. 15 is a diagram depicting the middleware API conversion operation according to another embodiment of the present invention.
Figure 17:
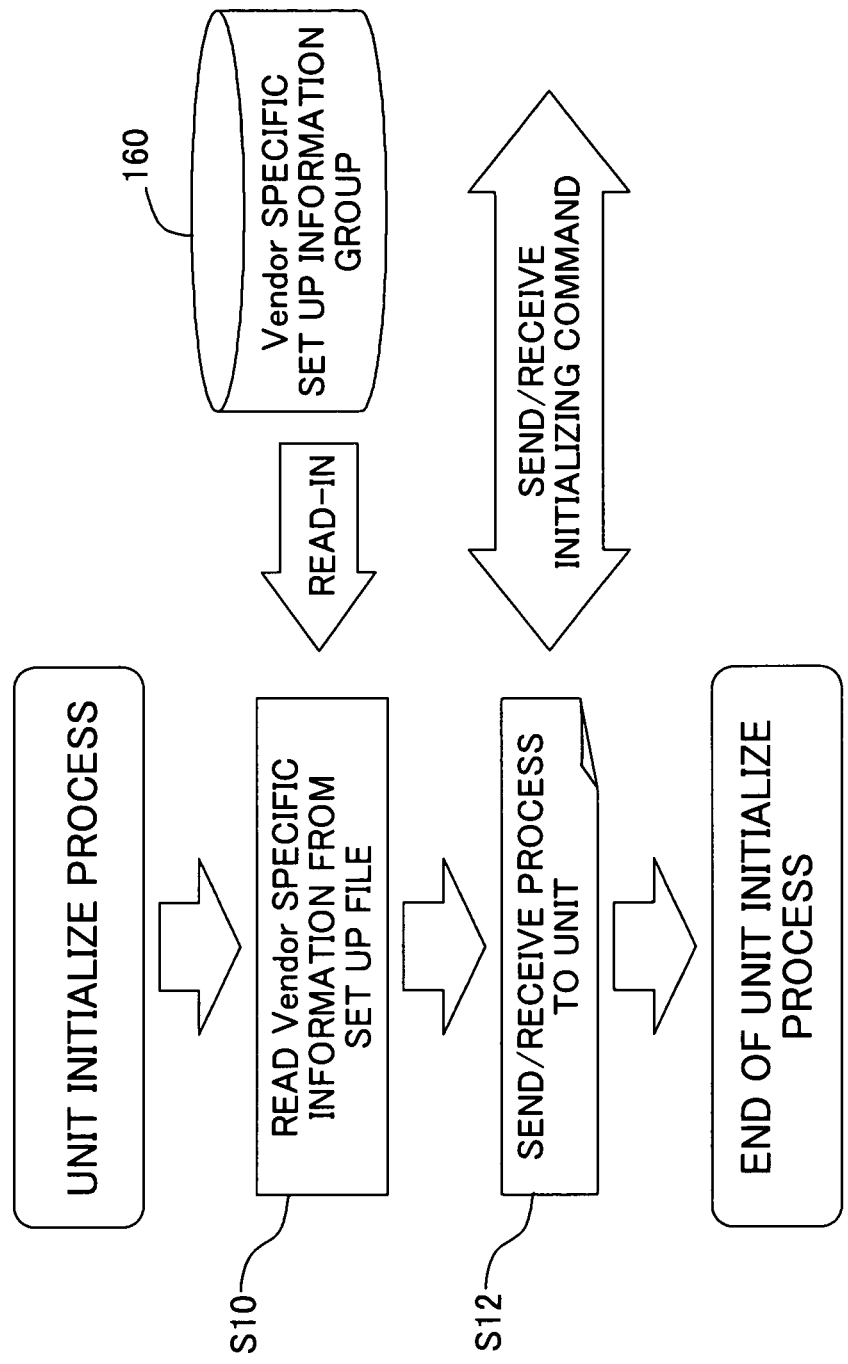
FIG. 17 is a flow chart depicting initialization interface conversion processing in the I/O control library.
Figure 21:
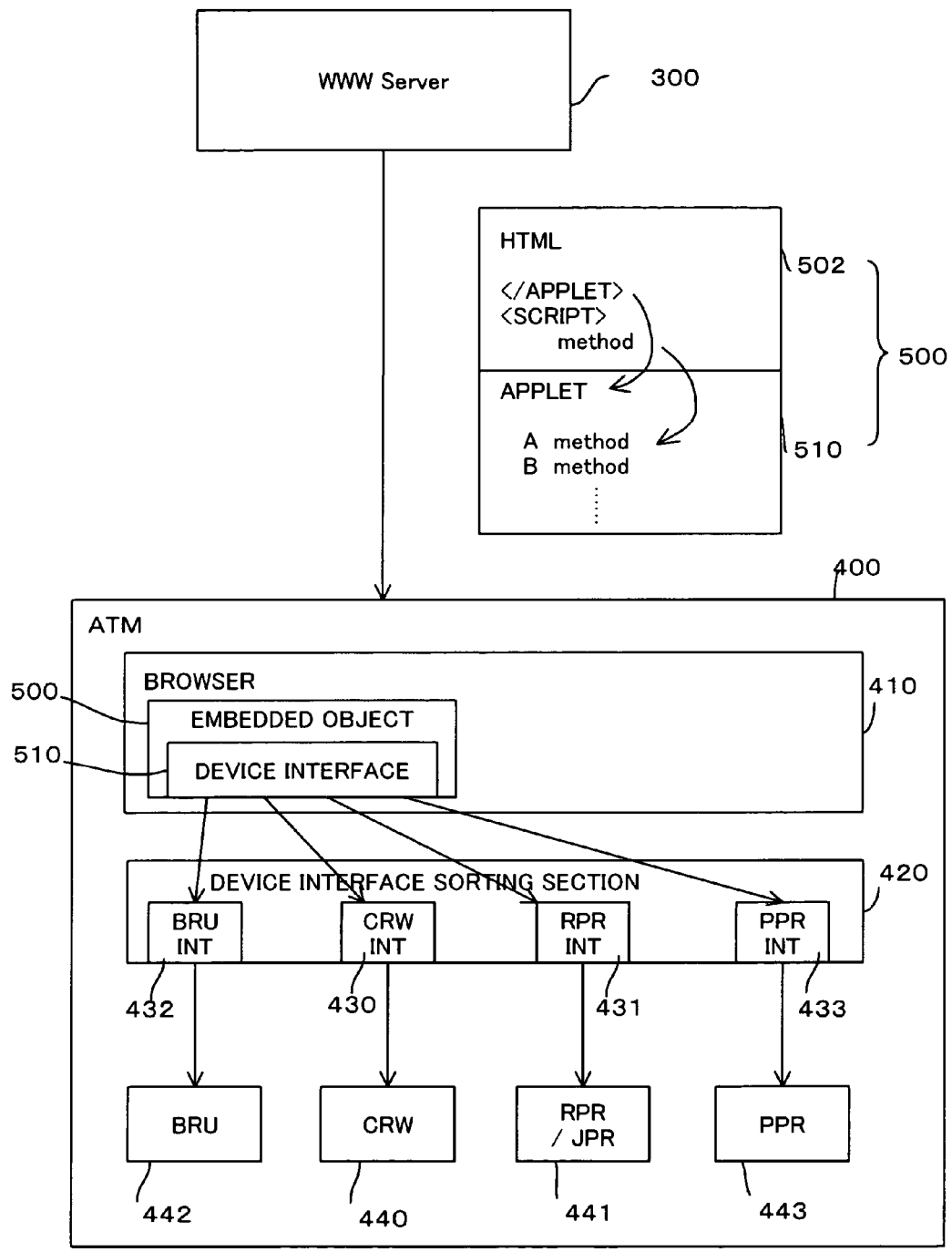
FIG. 21 is a diagram depicting the automatic transaction system by conventional Web control.

FIG. 14 and FIG. 15 are diagrams depicting the operation of an embodiment of the present invention, FIG. 16 is a table showing the common interfaces thereof and the vender specific interfaces, and FIG. 17 and FIG. 18 are flow charts depicting the interface conversion processing in the I/O control library.

In FIG. 14 and FIG. 15, the ATM application of the server 100 is a Web application, and the browser 120 issues the CRW (card unit) command and the BRU (bill unit) command with parameters a and b, and A and B as a common interface in the ATM applet function call-up format of Java (registered trademark).

On the other hand, in the ATM 1 as described in relation to FIG. 5, the parameter file 160 stores the input parameters/fixed parameters which are uniquely determined by the system specifications of each vender. In FIG. 14, the specific parameters c and d are stored for the CRW command A, and the specific parameters C, D and E are stored for the BRU command X as the setup information specific to the company A.

In the same way, in FIG. 15, the specific parameter C is stored for the CRW command A, and the specific parameters C, D, E and F are stored for the BRU command X as the setup information specific to the company B.

The I/O control layer 170 calls up the parameter specific to each I/O client layer 190 from this parameter file 160 when the ATM middleware 180, including the I/O client layer 190, is called up, and converts the common API into the convention client API.

For example, in FIG. 14, the I/O control layer 170 converts the CRW command A (a, b) of the common interface (API) into the command A (a, b, c, d) of the CRW middle API, sends it to the CRW middleware 180, and operates the CRW unit 10, and also converts the BRU command X (A, B) of the common interface (API) into the command X (A, B, C, D, E) of the BRU middle API, sends it to the BRU middleware 180, and operates the BRU unit 50.

In the same way, in FIG. 15, the I/O control layer 170 converts the CRW command A (a, b) of the common interface (API) into the command A (a, b, c) of the CRW middle API, sends it to the CRW middleware 180, and operates the CRW unit 10, and also converts the BRU command X (A, B) of the common interface (API) into the command X (A, B, C, D, E, F) of the BRU middle API, sends it to the BRU middleware 180, and operates the BRU unit 50.

This will be described using a specific example of the pass book processing command in FIG. 16. For the unit initialization command, the vender specific interfaces (parameters) to be provided are the pass book printer user type code, pass book ribbon near end check availability specification, pass book MS (Magnetic Stripe) error pause availability specification, pass book page markup and down use availability specification and page closing availability specification when a forgotten pass book is taken in, which can be specified depending on the specifications of the pass book unit of each vender.

For the pass book insertion processing command, the common interface (parameters) to be provided are the insertion medium logic type specification, pass book type number specification, W-MS (Wide Magnetic Stripe) switching function, stripe position specification, MS erase availability specification, specified line position specification, composite operation specification and camera control (camera is operated when a pass book is inserted) specification.

The vender specific interfaces (parameters) to be provided, on the other hand, are the MS position specification (e.g. the case when the position of the MS of the pass book is different depending on the financial institution), MS type (recording format), MS parameter (e.g. whether MS data is erasable) and line lamp specification (when a line lamp exists at the pass book entry, the lamp is turned ON at insertion and at ejection).

FIG. 17 is a flow chart depicting the above mentioned unit initialization processing.

(S10) When the unit initialization command is received, the vender specific setup information (parameters) on initialization is read from the parameter file 160.

(S12) The read parameters are attached to the initialization command, are then sent to the unit, and a reply is received.

FIG. 18 is a flow chart depicting the above mentioned pass book insertion processing.

(S20) When the pass book insertion command is received, the vender specific setup information (parameters) on the pass book insertion is read from the parameter file 160.

(S22) The parameters of the vender specific unit are edited from the read parameters and the parameters received from the common interface (input information).

(S24) The edited parameters are attached to the pass book insertion command, are then sent to the unit, and a reply is received.

In this way, the vender specific parameters are set in the parameter file 160 in advance, and the I/O control layer 170 edits the parameters of the command of the common interface (API) and the vender specific parameters of the parameter file 160, converts it into the command of the ATM middle API, sends it to the ATM middleware, and operates the vender specific I/O unit 10, so the vender specific I/O unit can be operated by the command of the common interface (API). In other words, conventional ATM middleware can be customized so as to operate with a standard interface.

[Other Embodiments]

Now other embodiments of the above mentioned Agent and method will be described. FIG. 19 is a table showing agents according to another embodiment of the present invention. As FIG. 19 shows, according to this example, the synchronization Agent and the method (program) are combined, and the synchronization Agent has initialization of synchronization control, mechanism reset, bill/coin insertion, medium simultaneous ejection, printing/feeding/MS write/ejection preparation, deposit return, storing, forced ejection/capturing, unit information acquisition/transaction status setting/two-screen display control, deposit/withdrawal preparation, forced replenishment, jam reset and card/pass book insertion.

The combined Agent/method issues a command to the I/O controller (that is the I/O unit) indicated by the black dot in FIG. 19, and receives the reply of the command execution result. For example, the initialization Agent/method of synchronization control issues the initialization command to the bill controller 175, coin controller 176, pass book controller 171, card controller 172, receipt controller 174, journal controller 177, transaction controller 178 and ten key controller 173 (see FIG. 5), has each controller execute initialization processing, and receives the initialization processing result from each controller as the reply.

In the same way, the mechanism reset Agent/method of synchronization control issues the mechanism reset command to the bill controller 175, coin controller 176, pass book controller 171, card controller 172, receipt controller 174, journal controller 177 (see FIG. 5), has each controller execute mechanism reset processing, and receives the mechanism reset processing result from each controller as the reply.

In the same way, the bill/coin insertion Agent/method of synchronization control issues the insertion command to the bill controller 175 and coin controller 176 (see FIG. 5), has each controller execute insertion processing, and receives the insertion processing result from each controller as the reply.

FIG. 20 shows the screen content to be transmitted by the Web server 100 according to another embodiment of the present invention.

As FIG. 20 shows, the Agent name to be called up in the screen is specified in the screen content described in HTML (page description language). As an example, the initialization Agent of the synchronization control (Sync) is called up here by the applet tag <APPLET CODE="U_agtSync_initial.class".

Also by the description <SCRIPT Language="javaScript>, call-up of the initialization Agent of the synchronization control is specified using Java script as the method. In other words, call-up of the initialization Agent/method of the synchronization control is specified by the description ret=document.U_agtSync_initial. Here the details of the screen display content are omitted.

When this screen content is downloaded to the browser 120, the initialization Agent of the synchronization control is specified by the applet tag, and the initialization Agent/method of the synchronization control is called up by the call-up method name of the SCRIPT.

As described above, the called up initialization method issues the initialization command to the bill controller 175, coin controller 176, pass book controller 171, card controller 172, receipt controller 174, journal controller 177, transaction controller 178 and ten key controller 173 (see FIG. 5), has each controller execute initialization processing, and receives the initialization processing result from each controller as the reply.

In this case as well, as FIG. 12 shows, the called up initialization method continuously issues the initialization command to the bill controller 175, coin controller 176, pass book controller 171, card controller 172, receipt controller 174, journal controller 177, transaction controller 178 and ten key controller 173 (see FIG. 5), and receives the reply from these controllers sequentially as the processing completes.

Therefore the I/O units can be controlled in parallel, and even a plurality of I/O units can be controlled in a short time. Whereas in the case of the method of specifying a method for each I/O unit using conventional Script, which is a sequential control for issuing commands and receives the reply sequentially for each script, as shown in FIG. 23, it takes time to control an I/O by the Web.

Also the above mentioned Agent is provided for each processing to which a processing unit name is assigned, so ATMs with various functions can be supported with the same applet tags and method names by slightly changing the content of the processing unit. In this example, the content of the processing unit is changed by changing the initial (input Param) in the parenthesis of the method name of the above mentioned method callup SCRIPT. In other words, as FIG. 11 shows, the input Param is comprised of the 8-bit information for setting the input flags for each I/O controller (bill, coin, pass book, card, receipt, journal, transaction control and ten key).

The input flag indicates that the input of the method to the I/O controller where "1" is set is enabled. The called up method refers to this input flag, and determines an I/O controller to which the command is issued. Therefore even ATMs with different functions can execute a same processing with a same applet tag and method name by operating the input flag by the Web server 100.

For example, if the input flag of coins is set to "0" in a transaction apparatus which does not handle coin, issuing a command to the coin controller can be prevented. In the same way, if the pass book input flag is set to "0" in a transaction apparatus which does not handle pass books, issuing a command to the pass book controller can be prevented.

According to this embodiment, compared with the example in FIG. 7, the applet (Agent) to be sent with the screen content can be divided into relatively small capacity programs, so the data volume of transmission content can be decreased, and communication time can be decreased.

In the case of the example of the Agent in FIG. 7, the applet of synchronization control is a relatively large capacity program, because the applet has many methods, but by saving the applet to the cache in the ATM 1, the transmission of this applet becomes unnecessary from the next time it is called up, and the data volume of the transmission content from the next time can be decreased, and communication time can be decreased.

In the above mentioned embodiments, the automatic deposit/withdrawal machine was described as an example of the automatic transaction apparatus shown in FIG. 1, but the present invention can be applied to other apparatus, such as a withdrawal machine, automatic cash loan machine and automatic issuing machine. The network was described using the Internet, but the present invention can also be applied to other networks, and the server can be applied not only for Java SCRIPT, but for other SCRIPTS as well.

The present invention was also described using customized middleware control by the common API as an example, but the present invention can be applied to middleware control without customization by the common API.

The present invention was described using the embodiments, but the present invention can be modified in various ways within the scope of the essential character of the present invention, which shall not be excluded from the scope of the present invention.

According to the present invention, operation of a plurality of I/O units can be controlled by embedding an Agent for each processing of transaction processing in the screen content of the Web server, and calling up one method for each processing, and the plurality of I/O units can be commonly used by different automatic transaction apparatus in a general transaction processing flow. Therefore the screen content for Web-controlled automatic transaction apparatus with different functions and configurations can be easily created, parallel control becomes possible, and high-speed I/O unit control can be implemented. Therefore the wait time of the user for the automatic transaction apparatus can be decreased, and the operation rate can be improved, which contributes to the popularization of automatic transaction apparatus by Web control.

What is claimed is:

1. An automatic transaction method, comprising:
   obtaining, by a browser in a controller, content from a web server when detecting a request for a transaction, the content including embedded control information with applets for controlling a processing of a plurality of I/O units having at least two different functions;
   interpreting, by the browser, a script and an applet tag embedded in the content and determining whether to invoke one of a first of the applets and a second of the applets for controlling one of the plurality of I/O units to perform a function of the transaction based on the interpreting;
   calling up, by an I/O controller in the controller, a program designated by a method name of the script and issuing a command to said one of the plurality of I/O units, each performing a sequence of the transaction,
   wherein the calling up includes:
      calling up one of a plurality of synchronous method programs which perform parallel synchronization of the plurality of I/O units, designated by the method name of the script;
      issuing commands to the plurality of I/O units having the at least two different functions for which parallel synchronization is controlled by interpreting an input parameter set as a flag indicating a value such that the plurality of I/O units matching the value execute the one of the plurality of synchronous method programs called up, and receiving replies from the plurality of I/O units for which the synchronization is controlled; and
      transmitting, by an agent of the I/O controller in the controller, a request to the web server according to a post method of the browser, designated by a synchronous method program which received the replies from the plurality of I/O units in response to a reception of the replies, and
   wherein the flag represents one of a preset plurality of values, each indicative of which I/O unit type to be called up and one or more I/O units matching the I/O unit type from ATM stations at different locations can be invoked to perform the method or function set by the flag.

2. The automatic transaction method according to claim 1, wherein the first of the applets directly calls up corresponding one of synchronous method programs designated by the method name of the script, and
   the second of the applets is enabled to issue an I/O command to another one of the plurality of I/O units having the at least two different functions.

3. The automatic transaction method according to claim 1, wherein an I/O control library group is provided, and requested commands and parameters are converted to operate the plurality of I/O units having the at least two different functions.

4. The automatic transaction method according to claim 1, the at least two different functions are supported with the applet tag and the method name by changing the input parameter to correspond with operations of the at least two different functions of the plurality of I/O units.

5. An automatic transaction apparatus, comprising:
   a control unit comprising:
      a display unit configured to display content from a web server when a request for a transaction is received, the content including embedded control information with applets for controlling a processing of a plurality of I/O units having at least two different functions;
      a computer having a browser configured to interpret a script and an applet tag embedded in the content and determining whether to invoke one of a first of the applets and a second of the applets;
      an I/O control unit configured to control one of the plurality of I/O units to perform a function of the transaction based on the interpreting, a program designated by a method name of the script being called and a command being issued to said one of the plurality of I/O units, each performing a sequence of the transaction; and
   wherein the computer is configured to
   receive an input parameter set as a flag indicating a value such that the plurality of I/O units matching the value execute the one of the plurality of synchronous method programs called up, and call up one of a plurality of synchronous method programs which perform parallel synchronization of the plurality of I/O units by, designated by the method name of the script,
   issue commands to the plurality of I/O units having the at least two different functions for which parallel synchronization is controlled by interpreting the input parameter and receive replies from the plurality of I/O units for which the synchronization is controlled, and
   wherein an agent of the I/O control unit is configured to transmit a request to said web server according to a post method of the browser when a synchronous method program completed to receive replies from the plurality of I/O units which performed the parallel synchronization, and
   wherein the flag represents one of a preset plurality of values, each indicative of which I/O unit type to be called up and one or more I/O units matching the I/O unit type from ATM stations at different locations can be invoked to perform the method or function set by the flag.

* * * * *